(12) United States Patent
Aggarwal et al.

(10) Patent No.: US 11,756,036 B1
(45) Date of Patent: Sep. 12, 2023

(54) UTILIZING SENSOR DATA FOR AUTOMATED USER IDENTIFICATION

(71) Applicant: Amazon Technologies, Inc., Seattle, WA (US)

(72) Inventors: Manoj Aggarwal, Seattle, WA (US); Prithviraj Banerjee, Redmond, WA (US); Gerard Guy Medioni, Seattle, WA (US); Brad Musick, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 581 days.

(21) Appl. No.: 16/714,348

(22) Filed: Dec. 13, 2019

(51) Int. Cl.
*G06V 40/12* (2022.01)
*G06Q 20/40* (2012.01)
*G06V 10/46* (2022.01)
*G06V 40/13* (2022.01)
*G06F 18/2321* (2023.01)

(52) U.S. Cl.
CPC ..... *G06Q 20/40145* (2013.01); *G06F 18/2321* (2023.01); *G06V 10/462* (2022.01); *G06V 40/13* (2022.01); *G06V 40/1359* (2022.01); *G06V 40/1376* (2022.01)

(58) Field of Classification Search
CPC ......... G06Q 20/40145; G06V 40/1359; G06V 10/462; G06V 40/1376; G06V 40/13; G06K 9/6221
See application file for complete search history.

(56) References Cited

U.S. PATENT DOCUMENTS

| | | | |
|---|---|---|---|
| 9,117,106 B2 | 8/2015 | Dedeoglu et al. | |
| 9,235,928 B2 | 1/2016 | Medioni et al. | |
| 9,418,274 B2* | 8/2016 | Aoki | G06V 40/1312 |
| 9,473,747 B2 | 10/2016 | Kobres et al. | |
| 10,127,438 B1 | 11/2018 | Fisher et al. | |
| 10,133,933 B1* | 11/2018 | Fisher et al. | H04N 5/247 |
| 2004/0117636 A1* | 6/2004 | Cheng | G06F 21/32 713/185 |
| 2013/0284806 A1 | 10/2013 | Margalit | |
| 2018/0075282 A1* | 3/2018 | Chen et al. | G06T 7/74 |

FOREIGN PATENT DOCUMENTS

| | | | | |
|---|---|---|---|---|
| CN | 105631397 A | * | 6/2016 | ........... G06F 16/24578 |
| JP | 3660864 B2 | * | 6/2005 | |
| JP | 2016099880 A | * | 5/2016 | ........... G06F 16/24578 |

* cited by examiner

*Primary Examiner* — Bruce I Ebersman
*Assistant Examiner* — Matthew Cobb
(74) *Attorney, Agent, or Firm* — Lee & Hayes, P.C.

(57) ABSTRACT

Techniques for an identity-verification system to analyze image data representing palms of users using a segmented, characteristic-based approach. The system may compare palm-feature data representing characteristics of a palm of a user (or "query palm") with stored palm-feature data of palms for user profiles (or "stored palms"). For instance, the system may identify characteristics of the query palm having salient or discriminative features, and compare palm-feature data for those discriminative characteristics to palm-feature data representing corresponding characteristics of stored palms of enrolled users. Additionally, the system may compare characteristics of the query palm with corresponding characteristics of stored palms until the system is confident that the query palm corresponds to a stored palm of a user profile. By performing simpler characteristic-by-characteristic sameness verification tasks, the system may reduce the amount of time and computing resources utilized to verify an identity of a user as opposed to top-level, palm-identity verification.

18 Claims, 13 Drawing Sheets

UTILIZING SENSOR DATA FOR AUTOMATED USER IDENTIFICATION

BACKGROUND

Retailers, wholesalers, and other product distributors often manage physical stores that utilize cashiers or dedicated self-checkout stands to finalize transactions with customers. During these traditional checkout processes, customers may have to carry and use physical objects for payment or identification, such a credit card or debit card, a driver's license, a phone, and so forth. In the future, physical stores may utilize various types of sensors to allow users to acquire and pay for items without cashiers or dedicated self-checkout stands. In some examples, it may be desirable to identify customers using methods that do not require the use of physical objects and charge the appropriate customer accounts for items taken from the physical stores by the customers.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
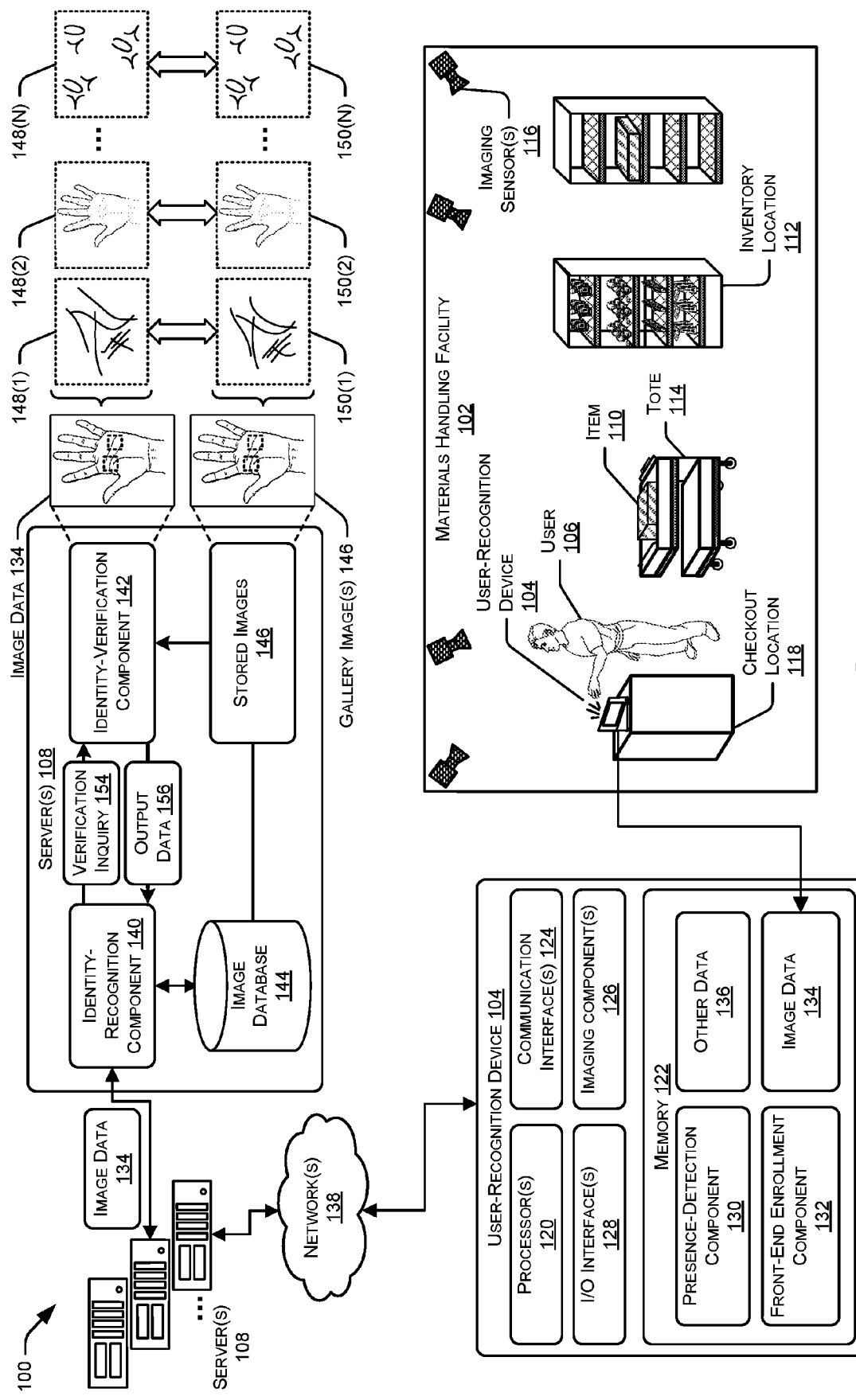
FIG. 1 illustrates an example environment that includes a user-recognition device to determine that a user would like to enroll with a user-recognition system. In this example, the user-recognition device generates image data corresponding to a palm of the user and sends the image data to one or more servers to enroll the user in the user-recognition system. In addition, the servers may perform segmented, characteristic-based comparisons of characteristics of a palm of a user with characteristics of stored palms to verify the identity of the user.

This disclosure describes systems and techniques for identifying users using biometric-recognition techniques, such as facial recognition techniques, palm-recognition techniques, and the like. As described below, users may enroll with a user-recognition system that utilizes various biometric-based recognition techniques so users may be identified without having to carry or use traditional forms of identification, such as showing an ID card or accessing their personal phone. The user-recognition system may recognize, or identify, enrolled users for various purposes, such as for automating traditional checkout experiences in a materials handling facility (or "facility") by charging appropriate user accounts with purchases of items selected by enrolled users in the facility.

In one illustrative example, the systems and techniques are used to recognize or identify users within a materials handling facility, which may include, or have access to, an inventory-management system. The inventory-management system may be configured to maintain information about items, users, condition of the facility, and so forth. For example, the inventory-management system may maintain data indicative of a result of different events that occur within the facility, such as what items a particular user picks or returns, a location of the particular user, and so forth.

Operation of the inventory-management system may be supported by sensor data acquired by one or more sensors. The sensor data may include image data acquired by imaging devices such as cameras, information acquired from radio frequency tags, weight sensors, and so forth. For example, the inventory-management system may automatically identify an item removed from an inventory location as well as a user that removed the item. In response, the inventory-management system may automatically update a virtual shopping cart of the user.

Traditionally, when a user has finished their shopping session, the user would have to pay for their items by having a cashier scan their items, or by using dedicated self-checkout stands. The techniques described herein reduce friction in the traditional checkout experience by recognizing or identifying a user enrolled for use of the user-recognition system and charging a user account for that user with the cost of the items included in their virtual shopping cart. According to the techniques described herein, a user enrolled with the user-recognition system may need only provide biometric information by, for example, scanning a palm of the user at an imaging device, scanning a fingerprint of the user, looking at a camera of a user-recognition device located in the facility, or the like in order to be identified by the user-recognition system.

To utilize the user-recognition system, a user may request to be enrolled by interacting with a user-recognition device positioned in a facility. For example, the user may select an enroll option on a display of the user-recognition device, issue a voice or GUI-based command requesting to be enrolled, insert a user ID card into the user-recognition device, and/or simply present their hand or palm before the user-recognition device to prompt the enrollment process.

Upon requesting to be enrolled in the user-recognition system, the user-recognition device may, with permission and/or upon explicit request by the user, begin collecting various types of biometric data, and/or other data, for the user. For example, the user-recognition device may include one or more imaging sensors (e.g., a camera) that begins capturing image data (e.g., an individual image, a sequence of images, a video, etc.) of at least a portion of the user, such as a palm of the user, a face of the user, or the like. In the example of the palm, the user-recognition device may request that the user move their hand to different angles and/or orientations as the device captures the image data and may also capture image data under different lighting conditions (e.g., no flash, flash, different light polarizations, near infrared light, infrared light, etc.), to generate image data representing the palm of the user under different environmental conditions.

In some examples, the user may already have an account registered with the inventory-management system to pay for items selected during a shopping session. In such examples, the user-recognition device may determine a user account with which the user is registered in various ways, such as by requesting that the user insert a personal ID card (e.g., driver's license), scan a barcode that may be presented on a display of a phone of the user, login with his or her login credentials, and so forth.

Once the user-recognition device has obtained the image data representing the palm or other potion of the user, the user-recognition device may utilize this data to enroll the user with the user-recognition system. In some examples, the user-recognition system may be implemented entirely on the user-recognition device, which may include the software, firmware, and/or hardware components to implement the techniques described herein. However, in some examples, the user-recognition system may be implemented according to a split architecture where the user-recognition device performs client-side enrollment and identification techniques, and more intensive and/or advanced processing may be performed using a backend, server-based implementation. For example, the user-recognition system may include one or more network-based computing devices positioned at a separate location in the facility, and/or at a remote, cloud-based location. The network-based devices may include various components for implementing the user-recognition system.

In such examples, the user-recognition device may send the image data, and/or feature data generated by the user recognition device using the image data, to the network-based devices to enroll the user for the user-recognition system. The network-based devices of the user-recognition system may perform various processing techniques on the image data and/or feature data such that the user-recognition system is able to identify the user from subsequently received image data and/or feature data.

The user-recognition system may analyze the image data to determine various features of the user. For example, the user-recognition system may extract and/or generate, based on the image data, palm-feature data representing the palm of the user. This palm-feature data may represent information that is potentially unique to the palm of the user, such as the pattern or shape of creases in the user's palm, the pattern of veins of the user's palm, the geometry of one or more characteristics of the user's hand (e.g., finger sizes/shape, palm size/shape, etc.), markings on the user's hand (e.g., tattoos, moles, scars, etc.), and/or the like. The user-recognition system may utilize any type of processing techniques to generate the palm-feature data and may represent the palm of the user depicted in the image data using various types of data structures, such as feature vectors. In some examples, the user-recognition system may include one or more trained models (e.g., machine-learning models) that have been trained to receive image data of a user as input, and output feature vectors representing a palm of the user. Generally, the trained model(s) may comprise any type of models, such as machine-learning models (e.g., artificial neural networks, convolution neural networks (CNNs), classifiers, random-forest models, etc.) that may be trained to identify a palm of a user and/or one or more other portions of the user (e.g., face, etc.).

Upon obtaining the feature data that represents the palm of the user, the user-recognition system may store the feature data in an image database and associate the feature data with a user profile for that specific user. In this way, when subsequent image data is received for a user at a user-recognition device, the feature data stored in the image database may be compared with the feature data generated from the subsequent image data to identify a user profile for the user represented in the subsequent image data.

In this way, the user may be enrolled for use of the user-recognition system such that, after completing subsequent shopping sessions, the user may checkout by placing his or her palm over an imaging component of a user-recognition device to allow the user-recognition system to automatically recognize the user. The user-recognition device may detect the presence of the user (e.g., detect the palm, detect a face, detect the speech utterance, detect a touch input via a touch display, etc.), and begin streaming image data to the backend devices of the user-recognition system. The backend devices of the user-recognition system may then utilize the trained model(s) to extract feature data and compare that feature data to stored feature data for user profiles of enrolled users. In addition, or in the alternative, the user may scan his or her palm for recognition upon entering the facility and, in some instances, may simply exit the facility with his or her picked items and without again scanning his or her palm. In these instances, the user may be identified upon entry and located by the system as the user moves about the facility, such that the user may "just walk out" without further interaction with associates or devices at the facility.

However, in some cases the user-recognition system may experience difficulties when identifying a user based on image data representing the palm of the user received from a user-recognition device. For instance, the image data may include one or more images of the palm of the user that were taken such that the palm appears blurry, represented under poor lighting conditions, is at least partially occluded by another object, and/or other issues may arise (e.g., the look and/or makeup of the palm of the user has significantly changed over time). In such examples, the user-recognition system may determine that the palm of the user at least partially corresponds to stored image data for one or more user profiles, but without a high enough confidence levels that are acceptable for associating a transaction with a user profile. In another example, the user-recognition system may match the palm of a user to a specific user profile, but an operator of the facility may receive disputes or inquiries from the user indicating that the user believes they were incorrectly identified as performing a transaction in the facility.

This disclosure describes systems and techniques for an identity-verification system to analyze image data representing palms of users using a segmented, characteristic-based approach by comparing palm-feature data representing characteristics of a palm of a user (or "query palm") with stored palm-feature data of palms for user profiles (or "stored palms"). The identity-verification system may identify characteristics of the query palm having salient or discriminative features, and compare palm-feature data for those discriminative characteristics to palm-feature data representing corresponding characteristics of stored palms of enrolled users. The identity-verification system may compare characteristics of the query palm with corresponding characteristics of stored palms until the system is confident that the query palm corresponds to a stored palm of a user profile. In some examples, the characteristics of the palms being compared may comprise characteristics of patches of the palms, such as the wrinkles, lines veins, scars, etc., for corresponding patches of the palms. In various examples, the characteristics of the palms being compared may be global characteristics, such as the shape of the palm, shape of the hand, size of the fingers, principle lines, veins in the hand, and/or other global features. By performing simpler characteristic-based (e.g., patch-based) sameness verification tasks, the system may reduce the amount of time and computing resources utilized to verify an identity of a user as opposed to top-level, palm-identity verification.

In some instances, the user-recognition system may process image data representing a palm of a user, or the query palm, that was received from a user-recognition device in a facility, and may be associated with a transaction occurring in the facility. The user-recognition system may have identified one or more possible candidate user profiles having enrolled palms, or stored palms, that at least partially correspond or match to the query palm. However, the user-recognition system may determine that the query palm and stored palms correspond with too low of confidence levels that are acceptable for associating a transaction with the user profiles. For instance, the user-recognition system may be 55% confident, 65% confident, and 85% confident that the query palm corresponds to user profile A, user profile B, and user profile C, respectively. However, the user-recognition system may be configured to associate transactions with user profiles only when the confidence level is at or above a threshold value, such as 100% confidence.

In such examples, the user-recognition system may provide the identity-verification system with the one or more user profiles that are determined to be the top candidates for corresponding to the query palm (e.g., user profiles A, B, and C). The identity-verification system may then perform techniques for analyzing feature data representing the query palm to feature data stored with the enrolled user profiles that represent the enrolled, stored palms.

In some instances, the identity-verification system may use a multi-stage cascading approach. A first stage of the cascading approach may include the identity-verification system comparing feature data representing the principle creases or lines of the query palm and stored palms. The identity-verification system may compare the shape and/or geometry of the principles creases of the palms to determine whether or not the principle creases match between the query palm and stored palms. If the principles lines in the query palm and stored palms do not match above a threshold similarity level, the identity-verification system may discard the user profiles with mismatching stored palms from further consideration for corresponding to the query palm.

In a second stage of the cascading approach, the identity-verification system may break down the top-level palm identity verification tasks(s) into simpler, characteristic-based sameness verification tasks where the characteristics being compared comprise less than all of the palms. Generally, palms of users contain salient features that contribute to their uniqueness, such as (i) epidermal ridges exhibiting deltas, loops and arch formations, (ii) bifurcation and terminal points of the epidermal ridge lines, (iii) intersection points of principle and crease lines, (iv) markings such as moles, freckles, tattoos, scars, (v) veins, vein junctions, terminal points of veins, (vi) shapes and/or geometries of the hand or one or more fingers, and/or other salient features. The identity-verification system may utilize one or more vision algorithms to generate a set of characteristic proposals that represent characteristics of the query palm (or hand) that are unique compared to other characteristics, such as other patches, of the query palm. Further, the identity-verification system may identify corresponding patches or characteristics of the stored palms using alignment components to find the spatially corresponding patches or characteristics. In some examples, the identity-verification system may identify the characteristics based not only on salient features, but also identify characteristics that are represented in different locations on the palms for diversity of characteristics across the palms.

After identifying the proposed characteristics of the palms, the identity-verification system may then extract or generate feature data that represent the characteristics of the query and stored palms that are to be compared with each other. The identity-verification system may perform a characteristic-by-characteristic comparison for the query and stored palm(s). By identifying and comparing characteristics of the palms, various advantages may be provided over top-level palm verification tasks. For instance, by comparing smaller amounts of feature data representing patches or characteristics of the palms as opposed to the entire palm, the matrix-based math used in comparing the patches of the palms is greatly reduced, which may decrease the amount of time and/or computing resources required to compare the palms. In some instances, comparing the palms using a characteristic-by-characteristic based analysis may require less time and/or computing resources than comparing the entirety of the palms using palm-level representations of the palms. Further, the characteristic-based analysis results in segregation of the feature data representing the palms such that each analysis system, component, human agent, or other verification source may be provided with less than all of the image representing a palm. This may increase the security of the identity-verification system in that the comparisons of characteristics of the palms may be isolated such that an entire representation of the palms may not be readily available to a single source, but rather, only characteristics of palms may be available to a single source. Further, in examples where algorithms are used to compare the palms that rely on momentum or a history, the characteristic-by-characteristic analysis may reduce bias in the momentum algorithms by dividing the comparisons between different patches, or different characteristics. Even further, the techniques described herein may provide consistency of identity decisions across different patches or characteristics of the images which in turn provides natural confidence values to the decision, and help differentiate between high, moderate, and low decisions.

The identity-verification system may compare the feature data representing the corresponding characteristics of the query palm and stored palm(s) until the system has determined that an overall measure of similarity between the query palm and a stored palm is above a threshold measure of similarity. For instance, each time the identity-verification system analyzes a patch of the query palm with reference to a patch of a stored palm, the identity-verification system may update an overall confidence score or measure of similarity for the query and stored palms. The identity-verification system may iteratively compare feature data representing characteristics of the query palm and stored palm(s) until the identity-verification system is confident that a stored palm does not correspond to the query palm, and/or until the identity-verification system determines that a stored palm does correspond to the query palm.

Upon determining that the query palm corresponds to a stored palm by more than a threshold (e.g., 100% correlation, 99% correlation, etc.), the identity-verification system may output an indication of the decision. In a facility session example, the identity-verification system may further store an association between a transaction performed via the query palm and the user profile enrolled for the stored palm. Stated otherwise, the identity-verification system may associate a transaction in a facility with a user profile upon determining that the user of that user profile used their palm (the query palm) to check-out, and that feature data of the query palm does correspond to the feature data of the stored palm that the user enrolled in an image database of the user-recognition system.

Accordingly, the identity-verification system may be configured to identify, or verify, an identity of a user via palm-recognition techniques. In some instances, the characteristic-based analysis may be used as a primary technique to identify the identity of users via their palms (or other biometric, such as facial features), and in other examples the characteristic-based analysis may be used as an identity audit tool to verify an identity of a user. In some instances, a user may submit an inquiry or complaint indicating that they believe their profile was inappropriately identified for a transaction or session. In such examples, the stored image may be stored in association with a profile of the user, and the query image may be compared to the stored image to determine whether or not the user's palm was properly identified as corresponding to the query palm.

In some examples, the query palm and stored palm may be submitted to the identity-verification system in instances where less than a threshold number of characteristics were compared to determine that the query and stored palms were determined to correspond. For instance, the user-recognition system may determine that a query palm and stored palm correspond by more than a threshold measure of similarity. However, if the user-recognition system compares less than a threshold number of characteristics (e.g., less than two, less than three, etc.), the identity-verification system may be called to verify the palms as being the same palms or not. For instance, the user-recognition system may only have image data clearly depicting one or two characteristics of the palms, such as one patch of the palms. Thus, even if the user-recognition system determines that the available patch for each palm correspond strongly to each other, it may be difficult to determine that the query and stored palm are the same due to only comparing a single characteristic of the palms. In such examples, the two (or more) images may be provided to the identity-verification component to determine whether or not the palms correspond to each other across additional characteristics.

Although the techniques described herein are primarily with reference to identifying users for the purpose of identifying a user account to charge for items selected from a materials handling facility, the techniques are equally applicable to any industry in which user recognition may be helpful. For instance, the user-recognition system may be implemented for security purposes such as accessing locked locations, accessing user accounts via computing devices, accessing bank accounts, and so forth. Further, while certain types of machine-learning models and algorithms are discussed herein, the techniques may be employed using other types of technologies and are generally scalable to different computer-based implementations. In some instances, the techniques may be utilized to identify users for other reasons beyond associating transactions for users, such as allowing and disallowing entrance into buildings, room, etc.

Additionally, while the techniques described herein are primarily with reference to identifying users using palm feature data, the user-identification techniques are equally applicable to any type of biometric data, such as fingerprint data, voice data, facial data, and/or any other type of biometric data and/or other data.

The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 of a materials handling facility 102 that includes a user-recognition device 104 to determine that a user would like to enroll for use of a user-recognition system. In this example, the user-recognition device 104 generates image data depicting a palm of a user 106 and sends the image data to one or more backend servers 108 to be used to enroll the user for use of the user-recognition system. In addition, the servers 108 may perform segmented, characteristic-based comparisons of characteristics of a palm of a user 106 with characteristics of stored palms to verify the identity of the user 106. Generally, the user-recognition system may include the user-recognition device 104 and/or the server(s) 108.

In some instances, some or all of the user-recognition system resides remotely from the materials handling facility 102, while in other instances some or all of the user-recognition system resides within or proximate to the materials handling facility 102. As FIG. 1 depicts, the user 106 may have engaged in, or be about to engage in, a shopping session in the materials handling facility 102. For instance, the user 106 may have selected an item 110 from an inventory location 112 (e.g., shelf, aisle, etc.) and placed the item 110 in a tote 114 (e.g., shopping cart). The inventory location 112 may house one or more different types of items 110 and the user 106 may pick (i.e., take) one of these items 110.

As illustrated, the materials handling facility 102 (or "facility") may include one or more sensors, such as the illustrated imaging sensors 116, and/or an array of other sensors located on or near the inventory location(s) 112. In this example, the imaging sensor(s) 116 are configured to capture video data within the facility 102 for use in determining results associated with events, such as the picking of the item 110 by the user 106. While FIG. 1 illustrates various example sensors, the sensors in the facility 102 may comprise any other type of sensor, such as weight sensors (e.g., load cells), microphones, and/or the like, as described in detail below. As described in more detail with respect to FIGS. 9 and 10, the facility 102 may be monitored and/or otherwise associated with an inventory-management system configured to determine events in the facility 102 associated with the user 106, such as taking items 110 that the user 106 would like to purchase. The inventory-management system may track the items 110 selected by the user 106 and maintain a virtual shopping cart which includes all of the items 110 taken by the user 106. Thus, when a user 106 would like to leave the facility 102 with the items 110 they have taken, the inventory-management system may charge a user account associated with the user 106 for the cost of the items 110 that were taken.

As shown in FIG. 1, the user 106 may approach a checkout location 118 associated with the user-recognition device 104. The user 106 may determine that they would like to enroll for use of a user-recognition system in order to checkout of the facility 102 and pay for their item(s) 110. Alternatively, or additionally, the user may interact with the user-recognition device 104 upon entering the facility 102. In either instance, the user 106 may determine that they would like the user-recognition system to collect data that is usable to identify the user 106. This data may be utilized by the user-recognition system such that, once enrolled, the user 106 need only scan his or her palm to be identified by the user-recognition system in order to charge their user account with the purchase of their item(s) 110.

FIG. 1 illustrates an example enrollment process that describes, at a high level, techniques for enrolling the user 106 for use of the user-recognition system. The user-recognition device 104 may comprise components for performing at least a characteristic of the techniques of the enrollment process, as may the servers. Components of the servers 108 are described in further detail below with reference to subsequent figures. For example, the user-recognition device 104 may comprise one or more processors 120 configured to power components of the device 104 and may further include memory 122 which stores components that are at least partially executable by the processor(s) 120, as well as other data. For example, the memory 122 may include a presence-detection component 130 to detect the presence of a user 106 and a front-end enrollment component 132 configured to perform various operations for enrolling the user 106 for use of the user-recognition system.

The front-end enrollment component 132 may receive a request to enroll the user 106 for use of the user-recognition system. The request may comprise various types of input, such as a selection made via an I/O interface 128 (e.g., touch screen, mouse, keyboard, etc.) of a user interface element presented on a display for starting an enrollment process. Additionally, the front-end enrollment component 132 may detect a speech utterance from the user 106 indicating a request to enroll (e.g., "please enroll me," "I would like to check out," etc.). Another request example may include the user 106 sliding a user ID card into an I/O interface 128, such as a credit card, driver's license, etc. However, any type of input may be detected as a request by the front-end enrollment component 132.

In some examples, the presence-detection component 130 may be executable by the processor(s) 120 to detect a trigger indicating presence of the user 106. The trigger detected by the presence-detection component 130 may comprise one or more types of input. For instance, the presence-detection component 130 may include logic to detect, using one or more imaging components 126, a palm of the user 106 over or proximate to the user-recognition device 104. Other examples of triggers detected by the presence-detection component 130 that may indicate the presence of the user 106 may include receiving touch input (or other input, such as a mouse click) via one or more I/O interfaces 128 of the user-recognition device 104. However, any type of input may be detected as a trigger by the presence-detection component 130. In some examples, the trigger detection may not be performed, or may be included in or the same as receiving the request to enroll.

After receiving the request to enroll from the user 106, the front-end enrollment component 132 may begin generating image data 134 using one or more imaging component(s) 126 (e.g., cameras). For instance, the front-end enrollment component 132 may utilize the imaging component(s) 126 to obtain image data 134 such as an image or picture, a sequence of consecutive images, and/or video data. The image data 134 may represent the palm of the user 106 and may be used to identify creases in the palm, veins in the palm, geometric information regarding the palm and other parts of the hand or the user 106 and/or the like. Once the front-end enrollment component 132 has obtained the image data 134 representing the palm or other portion of the user 106, the user-recognition device 104 may send (e.g., upload, stream, etc.) the image data 134 to the servers 108 over one or more networks 138 using one or more communication interfaces 124.

The network(s) 138 may include private networks such as an institutional or personal intranet, public networks such as the Internet, or a combination thereof. The network(s) 138 may utilize wired technologies (e.g., wires, fiber optic cable, and so forth), wireless technologies (e.g., radio frequency, infrared, acoustic, optical, and so forth), or other connection technologies. The network(s) 138 is representative of any type of communication network, including one or more of data networks or voice networks. The network(s) 138 may be implemented using wired infrastructure (e.g., copper cable, fiber optic cable, and so forth), a wireless infrastructure (e.g., cellular, microwave, satellite, etc.), or other connection technologies.

The communication interface(s) 124 may include devices configured to couple to personal area networks (PANs), wired and wireless local area networks (LANs), wired and wireless wide area networks (WANs), and so forth. For example, the communication interfaces 124 may include devices compatible with Ethernet, Wi-Fi™, and so forth. In some examples, the communication interface(s) 124 may encode the image data 134 and/or other data 136 (e.g., audio data) generated by the user-recognition device 104 prior to sending over the network(s) 138 according to the type of protocol or standard being used.

Upon receiving the image data, one or more components of the back-end servers 108 may generate feature data using the image data. This feature data may be in a vector form and may represent characteristics about the user's palm that may be used to differentiate the palm from other user palms. It is to be appreciated that while this process describes the servers 108 generating the feature data, in other instances the user-recognition device 104 may be configured to generate the feature data and may send the feature data, in addition to or rather than the image data 134, to the servers.

As illustrated, the one or more servers 108 may include an identity-recognition component 140 to determine an identity of a user 106 using the image data 134, an identity-verification component 142 to verify the identity of the user 106, an image database 144 to store associations between user profiles and image data 134 and/or feature data generated using the image data 134.

One or more components of the servers 108 store the image data and/or feature data in an image database 144 in association with a user profile of the user 106. That is, this palm-feature data is stored such that it may be compared to feature data generate from subsequent image data for later identification of the user 106 at the facility 102 or other facilities that are associated with the user-recognition system.

The identity-recognition component 140 may initially process the image data 134 and/or feature data that represents the image data 134 to determine an identity of the user 106. For instance, the identity-recognition component 140 may, as described in more detail below, compare feature data extracted from the image data 134 representing a query palm of the user 106 with feature data for user profiles that is stored in the image database 144. The identity-recognition component 140 may determine one or more top candidate user profiles that correspond to the features representing the query palm with higher measures of similarity. The identity-recognition component 140 may provide stored images 146 for the one or more user profile(s) that are most closely correlated to the image data 134 representing the query palm to the identity-verification component 142.

The identity-verification component 142 may compare feature data representing the image data 134 to feature data representing the stored images 146. The identity-verification component 142 may perform characteristic-based analysis where characteristics 148(1), 148(2), and 148(N) (where "N" is any integer greater than 1) are compared to characteristics 150(1), 150(2), and 150(N), respectively. The characteristics 148 may represent various types of feature data, or various types of "characteristics," that may be utilized to compare the query palm and stored palm(s). For instance, characteristics 148(1) and 150(1) may represent principle lines and crease lines of the palms. The principle/crease lines of the palms may be compared using respective feature data (e.g., vector-based comparison/math), and or by overlaying the lines for verification. The characteristics 148(2) and 150(2) may represent a geometry (e.g., exterior) of the hands represented in the image data 134 and stored image(s) 146. As another example, the characteristics 148(N) and 150(N) may represent delta and loop patterns. Generally, delta and loop patterns are commonly found discriminative fine-print arrangements in the palm region, particularly in the Volar Pad regions in the interdigital part of the palm. The patterns may be determined by analyzing respective gradient direction fields, and feature data representing the delta and loop patterns may be compared by the identity-verification component 142 to determine a measure of similarity between the query palm depicted in the image data 134 and the stored palms enrolled for the user profile(s). As a further example, the characteristics 148 and 150 may represent as spatial graphs with nodes corresponding to characteristics on the respective palms, and edges corresponding to their relative spatial orientation/location. The spatial graphs may be compared to determine measures of similarity for the locations/orientations of characteristics on the respective palms.

In some instances, the image data 134 and stored images 146 may comprise images representing palms under visible light. Additionally, or alternatively, the image data 134 and stored images 146 may comprise images representing palms under near-infrared light (NIR), or infrared light (IR). The image data 134 and stored images 146 that represent the palms under NIR and/or IR light may provide a subsurface modality which provides vein structure of the palm. Generally, hemoglobin in blood of the veins may absorb the NIR or IR light, resulting in a reduced amount of light reflection from the veins of the palms. A detection system may utilize this change in reflection to determine vein location, pattern, geometry, etc., of the veins. In this way, the image data 134 and stored images 146 may include images representing veins or vein characteristics of the palms/hands of the user. Accordingly, the characteristics 148 and 150 may comprise vein shape, vein junctions, vein geometry, and/or other vein characteristics that may be compared by the identity-verification component 142.

According to the techniques described herein, the identity-verification component 142 may receive a verification inquiry 154 from the identity-recognition component 140, and/or another source. The verification inquiry 154 may include at least pairs of images to be verified by the identity-verification component 142. For instance, the verification inquiry 154 may include image data 134 representing a query palm, and stored images 146 representing palms of enrolled users. However, in various examples, the pairs of images may represent palms other than query palms and stored palms. For instance, pairs of images representing palms from the image database 144 may be included in the verification inquiry 154 for processing to determine whether the palms belong to a same user, or different users.

The identity-verification component 142 may compute measures of similarity each time a characteristic 148/150 is compared for the query and stored palm (or other image data representing other input palms, such as offline processing of palms). The identity-verification component 142 may update the overall measure of similarity until the identity-verification component 142 can confidently (e.g., over/under threshold confidence values) disregard a stored image 146 as not corresponding to the image data 134, or verify that a stored image 146 does correspond to the image data 134 depicting the query palm. Upon identifying and/or verifying a stored image 146 as corresponding to the image data 134, the identity-verification component 142 may generate output data 156 indicating a result of the comparison of the image data 134 and stored images 146. For instance, the output data 156 may indicate that the image data 134 does correspond to a stored image 146, does not correspond to a stored image 146, or is unable to determine whether or not the image data 134 corresponds to a stored image 146.

In some examples, based on the output data 156, the identity-verification component 142 may store an association between the user profile for a corresponding stored image 146 and a transaction completed using the query palm represented in the image data 134. In this way, the appropriate user profile may be credited with performing the transaction.

Figure 2A:
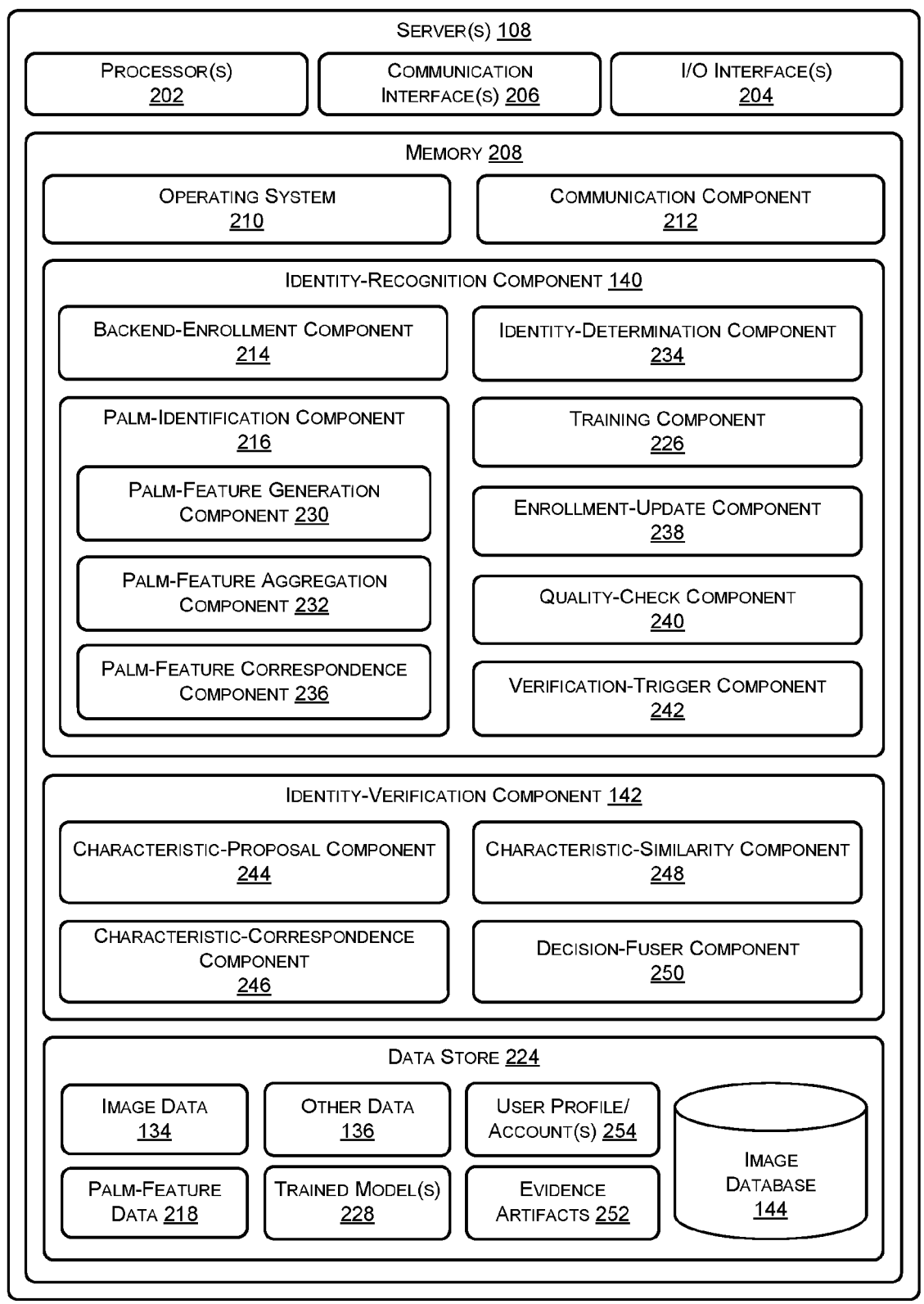
FIG. 2A illustrates example components of one or more servers configured to support at least a portion of the functionality of a user-recognition system including an identity-verification component.

FIG. 2A illustrates example components of one or more servers 108 configured to support at least a portion of the functionality of a user-recognition system including an identity-verification component 142. In some examples, the user-recognition system described herein may be supported entirely, or at least partially, by the user-recognition device 104 in conjunction with the servers 108. The server(s) 108 may be physically present at the facility 102, may be at a remote location accessible by the network 138, or a combination of both. The server(s) 108 do not require end-user knowledge of the physical location and configuration of the system that delivers the services. Common expressions associated with the server(s) 108 may include "on-demand computing," "software as a service (SaaS)," "cloud services," "data centers," and so forth. Services provided by the server(s) 108 may be distributed across one or more physical and/or virtual devices.

The server(s) 108 may include one or more hardware processors 202 (processors) configured to execute one or more stored instructions. The processors 202 may comprise one or more cores. The server(s) 108 may include one or more input/output (I/O) interface(s) 204 to allow the processor 202 or other portions of the server(s) 108 to communicate with other devices. The I/O interfaces 204 may comprise Inter-Integrated Circuit (I2C), Serial Peripheral Interface bus (SPI), Universal Serial Bus (USB) as promulgated by the USB Implementers Forum, RS-232, and so forth.

The server(s) 108 may also include one or more communication interfaces 206. The communication interfaces 206 are configured to provide communications between the server(s) 108 and other devices, such as the user-recognition device 104, the interface devices, routers, and so forth. The communication interfaces 206 may include devices configured to couple to personal area networks (PANs), wired and wireless local area networks (LANs), wired and wireless wide area networks (WANs), and so forth. For example, the communication interfaces 308 may include devices compatible with Ethernet, Wi-Fi™, and so forth.

The server(s) 108 may also include one or more busses or other internal communications hardware or software that allow for the transfer of data between the various modules and components of the server(s) 108.

As shown in FIG. 2A, the server(s) 108 includes one or more memories 208. The memory 208 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 208 provides storage of computer-readable instructions, data structures, program modules, and other data for the operation of the server(s) 108. A few example functional modules are shown stored in the memory 208, although the same functionality may alternatively be implemented in hardware, firmware, or as a system on a chip (SOC).

The memory 208 may include at least one operating system (OS) 210. The OS 210 is configured to manage hardware resource devices such as the I/O interfaces 204, I/O devices, the communication interfaces 206, and provide various services to applications or modules executing on the processors 202. The OS 210 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 208. These modules may be executed as foreground applications, background tasks, daemons, and so forth.

A communication component 212 may be configured to establish communications with one or more of the imaging sensors 116, the user-recognition devices 104, other server(s) 108, or other devices. The communications may be authenticated, encrypted, and so forth.

A backend-enrollment component 214 may be configured to perform various operations for enrolling a user 106 for use of the user-recognition system. For instance, the backend-enrollment component 214 may perform various operations, and/or cause other components to perform various operations, to enroll users 106 in the user-recognition system. In some instance, the backend-enrollment component 214 may at least partly control a palm-identification component 216 that performs operations for analyzing image data 134 depicting a palm or other portion of the user 106. In some examples, the backend-enrollment component 214 may cause the palm-identification component 216 to analyze the image data 134 and extract features which represent a palm of the user 106, such as palm-feature data 218.

After obtaining, determining, and/or generating the palm-feature data 218, the backend-enrollment component 214 may enroll the user 106 in an image database 144 which indicates that the user 106 is enrolled for use of the user-recognition system. In some examples, the backend-enrollment component 214 may associate, or map, the various data to a user profile/account 146 that is associated with the user 106. For example, the backend-enrollment component 214 may map, for each enrolled user 106, respective palm-feature data 218 to corresponding user profiles 254 in the image database 144. Thus, the image database 144 may store indications of user profiles 254, as well as the data for users 106 associated with each of the user profiles 254. When a user 106 is enrolled for use of the user-recognition system, the backend-enrollment component 214 may map, or store an association, between the user's 106 palm-feature data 218 with the user profile 254 for that user 106. Further, the user profile 254 may include various information for the user 106, such as payment information to perform transactions for items 110 selected by the user 106 from the facility 102. The various types of data discussed herein may be stored in a data store 224 in the memory 208 of the server(s) 108, as illustrated in FIG. 2A.

Further, the backend-enrollment component 214 may cause a training component 226 to train one or more trained models 228. The training component 226 may utilize the palm-feature data 218 and the lip movement feature data 222 to train the trained model(s) 228 to perform various operations for extracting and/or generating, from the image data 134, palm-feature data 218. The trained model(s) 228 may comprise any type of model, such as machine-learning models, including but not limited to artificial neural networks, classifiers, decision trees, support vector machines, Bayesian networks, and so forth.

As a specific example, the trained model(s) 228 may include or comprise one or more convolution neural networks (CNNs), recursive neural networks, and/or any other artificial networks, that are trained to analyze image data 134 received as input, and extract, determine, identify, generate, etc., palm-feature data 218 representing a palm of the user 106. As a specific example, the palm-feature data 218 may comprise a 128-dimension feature vector representing the palm of the user 106. In examples where the trained model(s) 228 include one or more CNNs, various functions may be utilized to transform the image data 134 into a metric space, such as a triplet loss function. Thus, the training component 226 may train the CNNs of the trained model(s) 228 using various functions, such as a triplet loss function, to extract, identity, or otherwise determine palm-feature data 218 from input image data 134. Once in the metric space, extracted feature data may be compared, or matched, by computing a distance between the extracted feature data and feature data stored in the image database 144. For instance, when feature data is extracted from the image data 134 into palm-feature data 218 by the trained model(s) 228, the extracted palm-feature data 218 may then be compared to stored data in the image database 144 to identify a user profile for the user 106 represented in the input image data 134. For instance, the extracted palm-feature data 218 may comprise a vector that is compared with stored vectors in the image database 144 to identify which stored vectors have the smallest "distance" between the extracted feature data. The smaller the distance, the closer the strength of correspondence between the extracted feature data and the stored feature data representing users 106 that are enrolled for use of the user-recognition system. In some examples, other calculations may be performed, such as finding a cosine of an angle between two vectors, depending on the network utilized by the trained model(s) 228. However, any type of models may be utilized for the trained model(s) 228.

The palm-identification component 216 may include various sub-components for performing various operations. For instance, the palm-identification component 216 may include a palm-feature generation component 230 to extract or otherwise generate feature data from the image data 134. The palm-feature generation component 230 may utilize the trained model(s) 228, and/or include algorithms, to perform any type of feature extraction method, or embedding, to analyze the image data 134 and extract the palm-feature data 218. For instance, the palm-feature generation component 230 may utilize state-of-the-art models, such as clustering, artificial neural networks, scale-invariant feature transform, edge detection, or any other type of extraction or embedding technology, to extract palm-feature data 218 from the image data 134.

The palm-identification component 216 may further include a palm-feature aggregation component 232 configured to aggregate feature data for a user 106. For instance, the palm-feature aggregation component 232 may combine palm-feature data 218 that has been extracted from a group of images depicting the user 106, such as by averaging the features in the palm-feature data 218.

Once a user 106 is enrolled for use of the user-recognition system, an identity-determination component 234 may be utilized to determine and/or verify an identity of a user 106 that interacted with a user-recognition device 104. For example, the server(s) 108 may receive image data 134 from a user-recognition device 104 and the identity-determination component 234 may be configured to determine an identity of the user 106, where the image database 144 indicates the identity of the user 106 by, for example, indicating the user profile 254 that is associated with that user's identity.

The identity-determination component 234 may cause a palm-feature correspondence component 236 to perform various operations for determining or identifying a user 106 whose palm is depicted in the received image data 134. For example, the palm-feature correspondence component 236 may compare the palm-feature data 218 for the received image data 134 with palm-feature data 218 stored in the image database 144 for different user profiles 254 of users 106 enrolled in the user-recognition system in order to determine user profiles 254 for one or more users 106 whose respective palm-feature data 218 correspond to the extracted palm-feature data 218. In some instances, the score calculated by the palm-feature correspondence component 236 may be compared to a threshold and, if the score is greater than the threshold, may result in identification of the user. If multiple user profiles are associated with scores that are greater than the threshold, then the user profile associated with the highest may be deemed to be associated with the image data 134 and/or further analysis may be performed to identify the appropriate user. Further, in some instances, the user-recognition system may employ set-reduction techniques to identify, based on an initial comparison, a top "N" group of user profiles 254 of users 106 whose respective palm-feature data 218 most strongly correspond to the extracted palm-feature data 218. In some examples, a single user identity/profile 254 may be determined as corresponding to the input palm-feature data 218. However, in some examples a group of top "N" candidates may be identified by the trained model(s) 228 as corresponding with a threshold amount of strength (e.g., 50% correspondence, 75% correspondence, etc.) to the extracted palm-feature data 218. A second level of deeper analysis may then be performed to identify a single user from the "N" candidates.

Further, the memory 208 may store an enrollment-update component 238 configured to update the palm-feature data 218 stored in association with user profiles to allow for removal of stale feature data and use of more recent feature data. As introduced above, as a user provides image data of the user's palm over time, the enrollment-update component 238 may use feature data from this new image data to generate and store additional feature data associated with the user. Further, the enrollment-update component 238 may remove or lessen a weight associated with older feature data. An example operation of the enrollment-update component 238 is described below with reference to FIGS. 3A-3B.

In addition, the memory 208 may store a verification-trigger component 242 configured to determine to call the identity-verification component 142 to determine whether to call the identity-verification component 142. As described in more detail in FIG. 2B, the verification-trigger component 242 may trigger the identity-verification component 142 to compare at least one pair of images representing palms based on one or more triggers. The triggers may include, for example, (i) an inquiry received from a user indicating a mistake made by identifying a query palm as corresponding to a stored palm of the user, (ii) the identity-recognition component 140 being unable to identity a stored palm as corresponding to a query palm by more than a threshold confidence/measure of similarity, (iii) an indication to perform an offline/out-of band audit of palms stored in the image database (e.g., determine whether two stored images in the image database 144 correspond to a same user), (iv) a determination that the identity-recognition component 140 compared a query palm and stored palm across less than a threshold number of characteristics (e.g., one characteristic, two characteristics, etc.), and/or and other type of trigger.

Additionally, the memory 208 may store a quality-check component 240 which determines an overall metric of the quality of the extracted palm-feature data 218. For instance, the quality-check component 240 may determine that additional image data 134 needs to be obtained for a user 106 for various reasons, such as a bandage or glove covering the palm of the user 106, or the like. In some examples, the quality-check component 240 may utilize a trained model(s) 228 to determine whether a feature vector is of sufficient quality and, if not, may cause the user-recognition device to request additional image data 134.

The memory 208 may also store the identity-verification component 142, which includes various components, such as a characteristic-proposal component 244, a characteristic-correspondence component 246, a characteristic-similarity component 248, and a decision-fuser component 250.

In examples where the identity-recognition component 140 is unable to identify a user profile 254 for received image data 134 with more than a threshold confidence level, the identity-verification component 142 may be provided with indications of the top N user profiles 254 that correspond to the image data 134 with the highest measures of similarity. The identity-verification component 142 may be configured to determine which user profile 254 corresponds to the image data 134 depicting a query palm.

The characteristic-proposal component 244 may include one or more vision algorithms to generate a set of K patch proposals (or characteristic proposals) using one or more of classical interest point detection techniques such as Scale-Invariant Feature Transform (SIFT), Harris Corner, Gradient Flow Convergence/Divergence, etc., as well as deep-learning based attention-saliency detection models. The characteristic-proposal component 244 may analyze the image data 134 to identify and propose characteristics of the depicts palms that are discriminative and diverse across location of represented characteristics, and also diverse across the types of characteristics. For instance, the characteristic-proposal component 244 may identify salient features such as (i) epidermal ridges exhibiting deltas, loops and arch formations, (ii) bifurcation and terminal points of the epidermal ridge lines, (iii) intersection points of principle and crease lines, (iv) markings such as moles, freckles, tattoos, scars, (v) shape, size, and/or geometry of a hand or palm, (vi) vein size, vein junctions, vein geometry, and/or other salient features. Additionally, the characteristics of the palm that are proposed by the characteristic-proposal component 244 may be diverse in location across the palms.

Generally, the characteristic-proposal component 244 may identify characteristics of the palm for analysis that have higher discriminative quality, and potentially higher image quality as well. Stated otherwise, the characteristic-proposal component 244 may identify characteristics of the palm that are easier to distinguish from neighboring patches. For instance, flat patches of the palm where pixels are uniformly similar may be less intrinsically informative compared to a pattern or junction of principle/crease lines. The characteristic-proposal component 244 may determine various types of characteristics for the palms, such as creases in the palms, shapes and geometry of creases, junctions of creases, markings (e.g., scars, tattoos, freckles, moles, scars, calluses, etc.), spatial graphs representing locations/relationships of patches of the palms, and/or other types of evidence markings.

The characteristic-correspondence component 246 may receive the proposed characteristics, such as proposed patches, from the characteristic-proposal component 244 and find the corresponding patches in stored palms of the user profile(s) 254. The characteristic-correspondence component 246 may utilize an alignment component, such as the palm-feature correspondence component 236, for finding the spatially corresponding patches or characteristics. The characteristic-correspondence component 246 may utilize u-v mapping-based alignment, direct cropping alignment, and/or other alignment algorithms to identify corresponding characteristics in the stored palms. In this way, the characteristic-correspondence component 246 may identify a corresponding set of patches/characteristics for the stored palms of the user profile(s) 254.

The characteristic-similarity component 248 may be configured to calculate or determine similarity measures between corresponding characteristics of a query palm and stored palm. The characteristic-correspondence component 246 may determine similarity scores that are robust to minor deformations (e.g., non-rigid rotation, translation, scale, etc.) in the structure and shape of primary-lines/fine-ridge structure in the palms. The characteristic-correspondence component 246 may utilized fine-grained alignment techniques for measuring similarity between the patches of the palms (and/or any characteristics). The characteristic-correspondence component 246 may utilize warp-based alignment techniques. The inferred warp parameters may be viewed as a deformation grid and provide evidence of transformation used to match the stored palm with the query palm. In another example, the characteristic-correspondence component 246 may utilize optical flow estimates which measure the apparent motion between query image data 134 and the stored image data of the user profile(s) 254, and may provide a motion field image for representing the transformation. For same-identity image patches, the optical flow may be near zero and continuous, whereas for not-same identity patches, the optical flow may be noisy and discontinuous. The characteristic-correspondence component 246 may calculate measures of similarity indicating similarities between the query palm and stored palm, or confidence values indicating a likelihood that the query palm corresponds to the stored palm. In some examples, the characteristic-correspondence component 246 may store evidence artifacts 252 indicating comparisons between characteristics of palms that have been made, and decisions made for those comparisons.

The decision-fuser component 250 may analyze the individual characteristic-wise decisions made by the characteristic-similarity component 248 and make a combined decision based on one or more of (i) the number of characteristics considered, (ii) the diversity of features in the set of characteristics considered, and/or (iii) the quality of salient features present in the characteristics. The decision-fuser component 250 may, for example, increase or decrease the confidence values for the correspondence between the query palm and stored palm based on the above-noted factors. For instance, the decision-fuser component 250 may become more confident that query and stored palms correspond to each other as the number of characteristics considered increases, the diversity of feature types increases, and/or the quality of the salient features represented in the characteristics increases. The decision-fuser component 250 may calculate overall measures of similarity and/or overall confidence values indicating a likelihood that a query palm and stored palm correspond to each other. In this way, the decision-fuser component 250 may make a decision as to whether image data representing a query palm corresponds to feature data representing stored palms for user profiles 254.

Figure 2B:
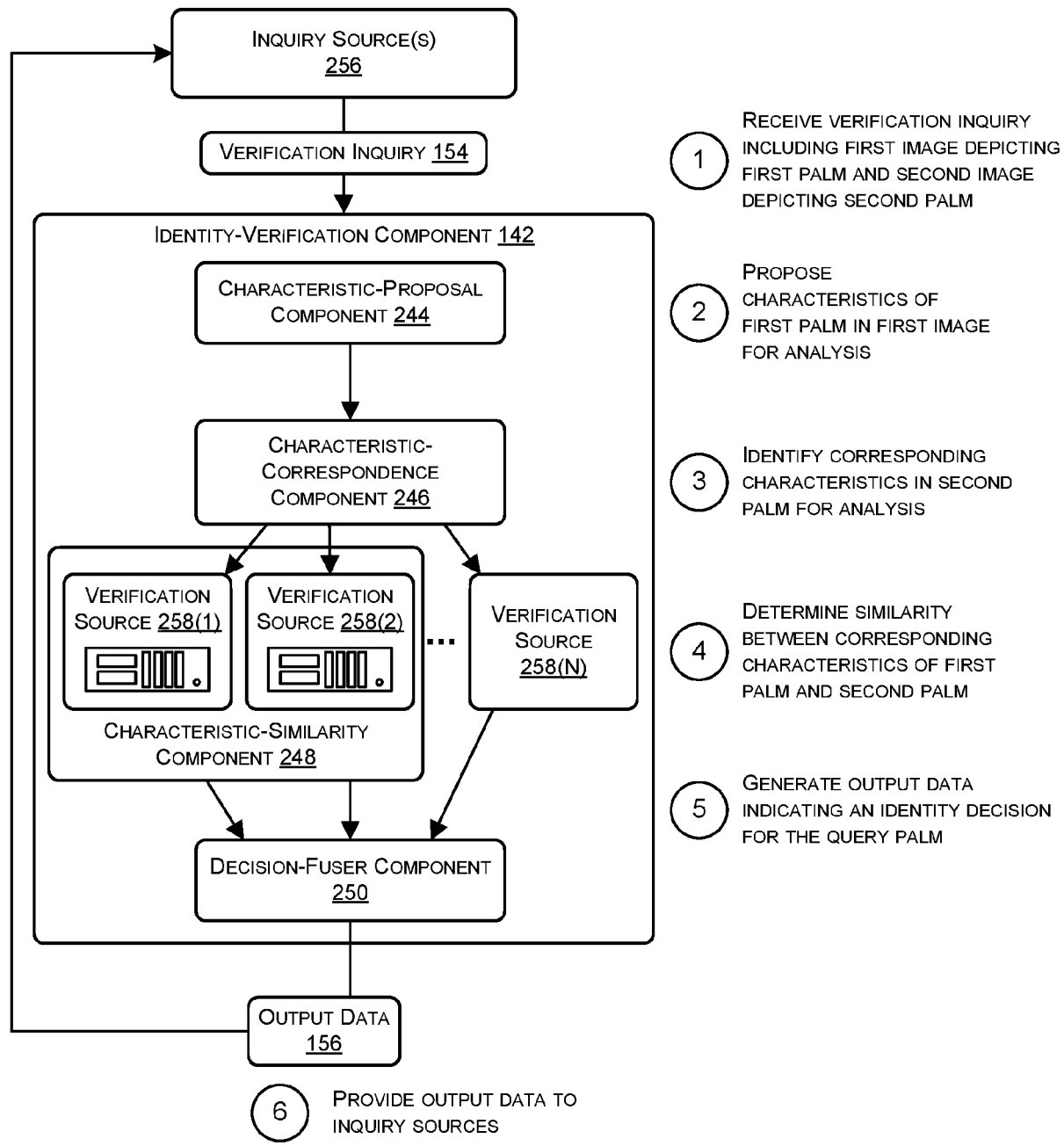
FIG. 2B illustrates an example data flow through the example components of FIG. 2A for verifying an identity of a query palm with respect to a stored palm.

FIG. 2B illustrates an example data flow through the example components of FIG. 2A for verifying an identity of a query palm with respect to a stored palm. In some examples, at "1", a verification inquiry 154 may be received, from one or more inquiry source(s) (e.g., the verification-trigger component 242, one or more users, etc.) at the identity-verification component 142 including a first image depicting a first palm and a second image depicting the second palm. The verification inquiry 154 may be received from various sources. In some instances, the first image and second image may depict the palms under visible light conditions, or NIR/IR light conditions, or include multiple images (at least one under visible light and at least one under NIR/IR). In an example where the first image and second image depict palms under visible light, the characteristics of the palm are depicted in the images may include characteristics such as (i) epidermal ridges exhibiting deltas, loops and arch formations, (ii) bifurcation and terminal points of the epidermal ridge lines, (iii) intersection points of principle and crease lines, (iv) markings such as moles, freckles, tattoos, scars, (v) shapes and/or geometries of the hand or one or more fingers, and/or other salient features. Additionally, or alternatively, the first and second image(s) may depict the palms of the users under NIR/IR light and present characteristics such as veins, vein junctions, terminal points of veins, etc. For instance, hemoglobin in blood of the veins may absorb the NIR or IR light, resulting in a reduced amount of light reflection from the veins of the palms. A detection system may detect this change in reflection to determine vein location, pattern, geometry, etc., of the veins. In this way, the first and second image(s) may include images representing veins or vein characteristics of the palms/hands of the user.

As noted above, various sources may provide the verification inquiry 154, or at least prompt the verification inquiry 154. As an example, the verification-trigger component 242 may initially determine that the first palm corresponds to the second palm by less than a threshold confidence value or similarity score to confidently output a match decision, but greater than another threshold to confidently rule out a match decision. As another example, the verification-trigger component 242 may determine that, although the first palm was confidently determined to correspond to the second palm by more than a threshold confidence, the palms were compared across less than a threshold number of characteristics (e.g., only one characteristic, or two characteristics). Further, the verification-trigger component 242 may determine that a user has submitted an inquiry or complaint indicating that they believe their palm was inappropriately identified as corresponding to another palm. In such examples, a stored image may be enrolled with a profile of the user, and the query image may be compared to the stored image to determine whether or not the user's palm was properly identified as corresponding to the query palm. In even further examples, the verification inquiry 154 may be submitted during an offline, or out-of-band, processing session to compare stored palms in the image database 144. For instance, the intensity-verification component 142 may be called to compare a first store palm and a second stored palm that are similar to determine whether the palms belong to the same person, or if separate people have similar palm characteristics. In this way, the identity-recognition component 140 may store data indicating that the palms are the same, or different, in the image database 144 for later processing when the one or more users utilize their palm for identity recognition.

In on example, the first image is a query image and the second image is a stored image. In such an example, a user-recognition device 104 may capture one or more images representing a palm of a user 106. The images representing the palm may be generated using various modalities, such as visible light images, NIR, or IR modalities, and so forth. For instance, at least one of the images may represent the specular reflection from an IR projection. In some instances, the first images may represent a subsurface modality which provides a vein structure of the hand of the user 106 by getting diffused components of the signal. The user-recognition device 104 may provide image data 134 representing the one or more images of the user's 106 hand and/or palm to the identity-recognition component 140 running on the server(s) 108.

The palm-identification component 216 may determine whether any stored palms correspond to the query palm represented in the image data 134. For instance, the palm-identification component 216 may include a palm-feature generation component 230 to extract or otherwise generate feature data from the image data 134. The palm-feature generation component 230 may utilize the trained model(s) 228, and/or include algorithms, to perform any type of feature extraction method, or embedding, to analyze the image data 134 and extract the palm-feature data 218. For instance, the palm-feature generation component 230 may utilize state-of-the-art models, such as clustering, artificial neural networks, scale-invariant feature transform, edge detection, or any other type of extraction or embedding technology, to extract palm-feature data 218 from the image data 134. In some examples, the palm-identification component 216 may identify one or more stored palms that, at least partly, correspond to the query palm.

The verification-trigger component 242 may determine to verify whether the stored palm (or palms) correspond to the query palm. The verification-trigger component 242 may determine that verification is needed based on various triggers. For example, a user may submit an inquiry or complaint indicating that they believe their profile was inappropriately identified for a transaction or session. In such examples, verification-trigger component 242 may determine that verification of the query palm as corresponding to the identified stored palm is needed. As another example, the verification-trigger component 242 may determine that less than a threshold number of characteristics were compared to determine that the query and stored palms were determined to correspond. For instance, the palm-identification component 216 may determine that a query palm and stored palm correspond by more than a threshold measure of similarity. However, if the palm-identification component 216 compares less than a threshold number of characteristics, the verification-trigger component 242 may be triggered to call the identity-verification component 142 to verify the palms as being the same palms or not. As a further example, the verification-trigger component 242 may determine to, at least periodically, perform checks or audits on the performance of the palm-identification component 216 to ensure that query palms are accurately being matched to stored palms. However, additional triggers may cause the verification-trigger component 242 to determine to verify that query palm corresponds to the one or more stored palms determined to correspond to the query palm by the palm-identification component 216.

Accordingly, the verification-trigger component 242 may send or output a verification inquiry 154 that may include image data 134 (or feature data 218) for the query palm and stored palm(s), any characteristics, hypothesis for the palms corresponding to each other (e.g., confidence values), and a request for the identity-verification component 242 to verify whether or not the query palm corresponds to the one or more stored palms.

As described below, the first image depicting the first palm and the second image depicting the second palm need not necessary correspond to a query palm and a stored palm, but may generally correspond to any palms for which comparison is requested to determine whether the palms belong to the same user, or are the same palms, belong to different users, or if the identity-verification component 142 is unsure whether the first and second palms are the same palms or not. Accordingly, the first and second palms may be any palms being compared under any circumstances, and as part of any type of identity recognition system.

At "2," the characteristic-proposal component 244 may propose one or more first palm characteristics for analysis with respect to corresponding characteristics of the second palm to verify whether the first palm belongs to a same user as a second palm. The characteristic-proposal component 244 may use one or more vision algorithms to generate a set of K patch proposals (or characteristic proposals) using one or more of classical interest point detection techniques such as Scale-Invariant Feature Transform (SIFT), Harris Corner, Gradient Flow Convergence/Divergence, etc., as well as deep-learning based attention-saliency detection models. The characteristic-proposal component 244 may analyze the first image to identify and propose characteristics of the first palm that are discriminative and diverse across location of represented characteristics, and also diverse across the types of characteristics. For instance, the characteristic-proposal component 244 may identify salient characteristics or features such as (i) epidermal ridges exhibiting deltas, loops and arch formations, (ii) bifurcation and terminal points of the epidermal ridge lines, (iii) intersection points of principle and crease lines, (iv) markings such as moles, freckles, tattoos, scars, (v) veins, vein junctions, terminal points of veins, (vi) shapes and/or geometries of the hand or one or more fingers, and/or other salient features. The identity-verification system may utilize one or more vision algorithms to generate a set of characteristic proposals that represent characteristics of the first palm (and/or hand) that are unique compared to other characteristics, such as other patches, of the first palm. Additionally, the characteristics of the palm that are proposed by the characteristic-proposal component 244 may be diverse in location across the palms.

At "3," the characteristic-correspondence component 246 may receive the proposed characteristics, such as proposed patches, from the characteristic-proposal component 244 and find the corresponding patches in second palm. The characteristic-correspondence component 246 may utilize an alignment component, such as the palm-feature correspondence component 236, for finding the spatially corresponding patches or characteristics. The characteristic-correspondence component 246 may utilize u-v mapping-based alignment, direct cropping alignment, and/or other alignment algorithms to identify corresponding characteristics in the second palm. In this way, the characteristic-correspondence component 246 may identify a corresponding set of patches/characteristics between the first palm and second palm.

The characteristic-correspondence component 246 may output portions of the first image data and second image data corresponding to the characteristics, such as patches, of the first and second palms to different verification sources 258(1), 258(2), to 258(N) (where "N" is any integer greater than 1). At "4," the verification sources 258 may each determine similarities between corresponding characteristics of the first palm and the second palm. According to the techniques described herein, the verification sources 258 may be isolated from each other such that no verification source 258 obtains all of the first image data and/or second image data. For security purposes, and/or other purposes, the verification sources 258 may be provided with portions of the image data, or portions of representative feature data, that represents at least one characteristic of the first and second palms, but less than all of the first and second palms. In this way, no verification source 258 may obtain, analyze, store, or otherwise interact with all of the first and second image data. The verification sources may be separate, remote, isolated entities from one another to isolate the similarly determination process.

As an example, a first source 258(1) may be running on a first server 108 or device, and the second source 258(2) may be running on a second server 108 or device. The verification sources 258(1) and 258(2) may run part, or all, of an instance of the characteristic-similarity component 248. Thus, the verification sources 258(1) and 258(2) may each be configured to calculate or determine similarity measures between corresponding characteristics of a first palm and second palm. In some instances, the verification sources 258(1) and 258(2) may be trained for specific characteristic comparisons, but not all characteristic comparisons. The verification sources 258(1) and 258(2) may determine similarity scores that are robust to minor deformations (e.g., non-rigid rotation, translation, scale, etc.) in the structure and shape of primary-lines/fine-ridge structure in the palms.

The verification sources 258(1) and 258(2) may utilized fine-grained alignment techniques for measuring similarity between the patches of the palms (and/or any characteristics). The verification sources 258(1) and 258(2) may utilize warp-based alignment techniques. The inferred warp parameters may be viewed as a deformation grid and provide evidence of transformation used to match characteristics of the first palm with the second palm. In another example, the verification sources 258(1) and 258(2) may utilize optical flow estimates which measure the apparent motion between a portion of the first image and a portion of the second image, and may provide a motion field image for representing the transformation. For same-identity image patches, the optical flow may be near zero and continuous, whereas for not-same identity patches, the optical flow may be noisy and discontinuous. The characteristic-correspondence component 246 may calculate measures of similarity indicating similarities between the first palm and second palm, or confidence values indicating a likelihood that the first palm corresponds to the second palm.

As an example, the verification source 258(1) may analyze a portion of the first image data and a portion of the second image data depicting principle lines of the first and second palms. For instance, the verification source 258(1) may determine how similar, or how divergent, the shape, junctions, terminal points, locations, etc., the principle lines of the first and second palm are with respect to each other. The verification source 258(1) may only be provided image data and/or feature data representing the principle lines of the palms, and not the entirety of the palms. Similarly, the verification source 258(2) may determine a measure of similarity between veins of the first and second palms in a similar manner, such as by determining how similar or divergent the shape, size, length, junctions, etc., the veins shown in the first and second palms are. However, the verification source 258(2) may only be provided image data (e.g., NIR/IR image data) and/or feature data representing veins of the palms, and not the entirety of the palms.

In some instances, the verification source 258(N) may comprise a non-automated solution, such as a human associate or agent. The human associate 258(N) may similarly be provided with only portions of the first and second images, such as patches of the palms in the images, to determine similarities without being provide access to all of the first and second images. In this way, human associates may be provided with portions of image data at viewing devices, and further be provided with options regarding the portions of the first and second images presented to them at the viewing devices, such as an option to indicate the portions of the palms are the same, different, or unsure. In some examples, multiple verification sources 258(N) may be human associates that are provided with the same portions of the first and second images to receive multiple answers (e.g., three answers) to provide a quorum regarding whether or not portions of the first and second palms correspond, or are the same. In this way, trained human associates may be provided with less than all of the first and second images to provide feedback regarding similarities between characteristics of the first and second palms, without being able to view all of the first and second palms.

In this way, the similarities between characteristics of the palms may be determined using multiple verification sources 258, but increase security by ensuring that the verification sources 258 are provided with only portions of the first and second images, and not all of the first and second images (e.g., only image/feature data depicting a patch of the palms, a finger of the palms, an outline of the palms, a scar on the palms, etc.). The verification sources 258 may provide indications as to whether the characteristics of the first and second palms being compared are similar, or not similar, and may further provide confidence scores or values indicating measures of similarity between the respective characteristics being evaluated by each of the verification sources 258.

At "5," decision-fuser component 250 may analyze the individual characteristic-wise decisions made by each of the verification sources 258 and make a combined decision based on one or more of (i) the number of characteristics considered, (ii) the diversity of features in the set of characteristics considered, (iii) the quality of salient features present in the characteristics, and/or (iv) the confidence values for the similarities decisions made by each of the verification sources 258. The decision-fuser component 250 may, for example, increase or decrease the confidence values for the correspondence between the first palm and second palm based on the above-noted factors. For instance, the decision-fuser component 250 may become more confident that first and second palms correspond to each other as the number of characteristics considered increases, the diversity of feature types increases, and/or the quality of the salient features represented in the characteristics increases. The decision-fuser component 250 may calculate overall measures of similarity and/or overall confidence values indicating a likelihood that the first palm and second palm correspond to each other. In this way, the decision-fuser component 250 may make a decision as to whether first image/feature data representing a first palm corresponds to second image/feature data representing a second palm.

The decision-fuser component 250 may generate and transmit output data 156 to the inquiry sources 256 indicating a decision made regarding the first and second palm. The output data 156 may indicate that the first and second palms correspond (e.g., are the same palms), do not correspond (e.g., belong to different users), or that the identity-verification component 142 was unable to confidently determine that the palms correspond, or do not correspond, to each other. The output data 156 may further include evidence artifacts indicating the characteristics compared by the verification sources 158 as well as decisions made based on those comparisons for the characteristics of the first and second palms. The inquiry sources may make decisions based on the output data 156, such as associating/disassociating a transaction with a user account, allowing/disallowing a user access to a building, user account, and/or other identity-access system, etc.

Figure 3A:
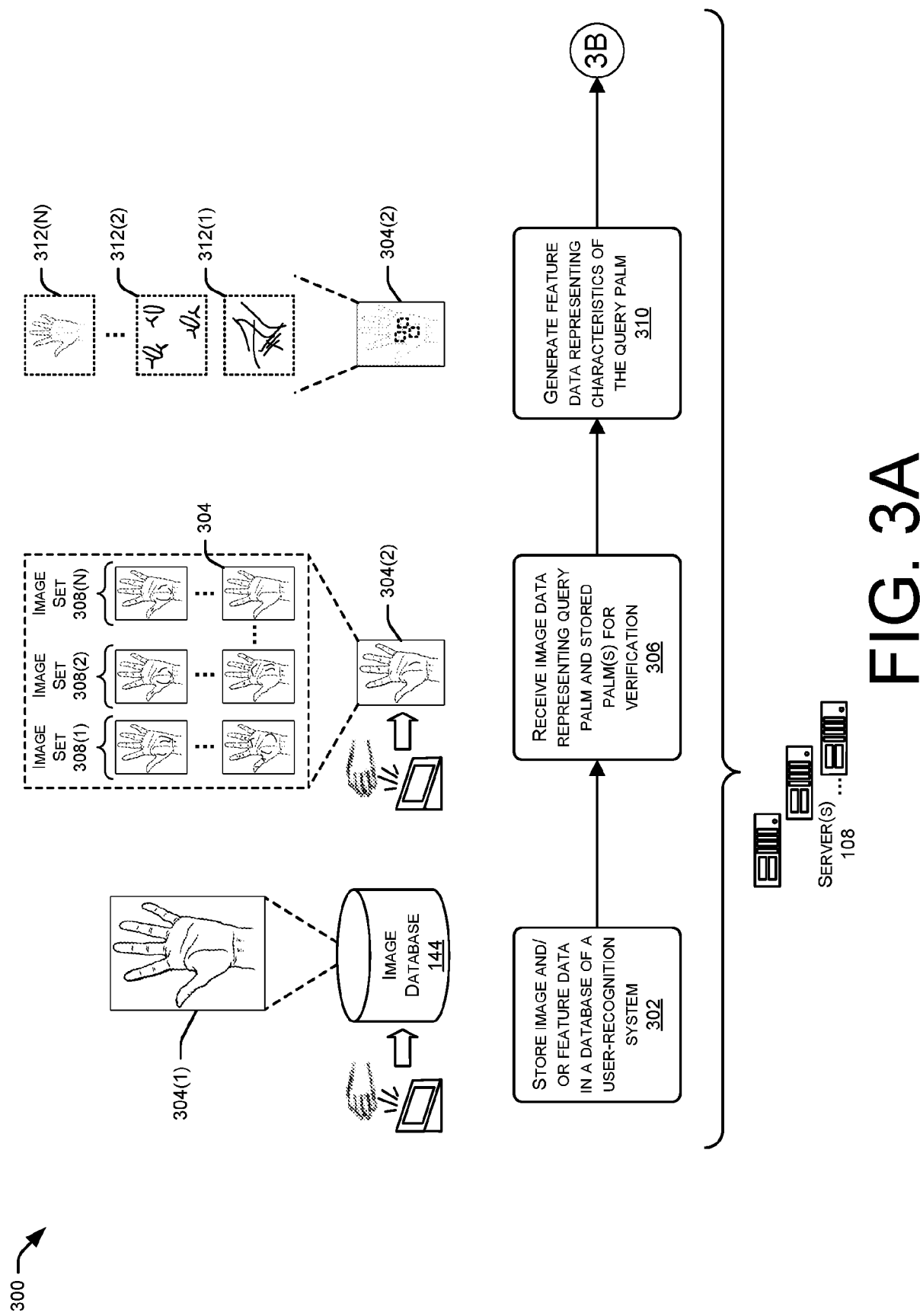
FIGS. 3A-3B collectively illustrate an example process for enrolling a user in the user-recognition system of FIG. 1, as well as verifying the identity of the user thereafter using characteristic-based analysis of the query palm and a stored palm.
Figure 3B:
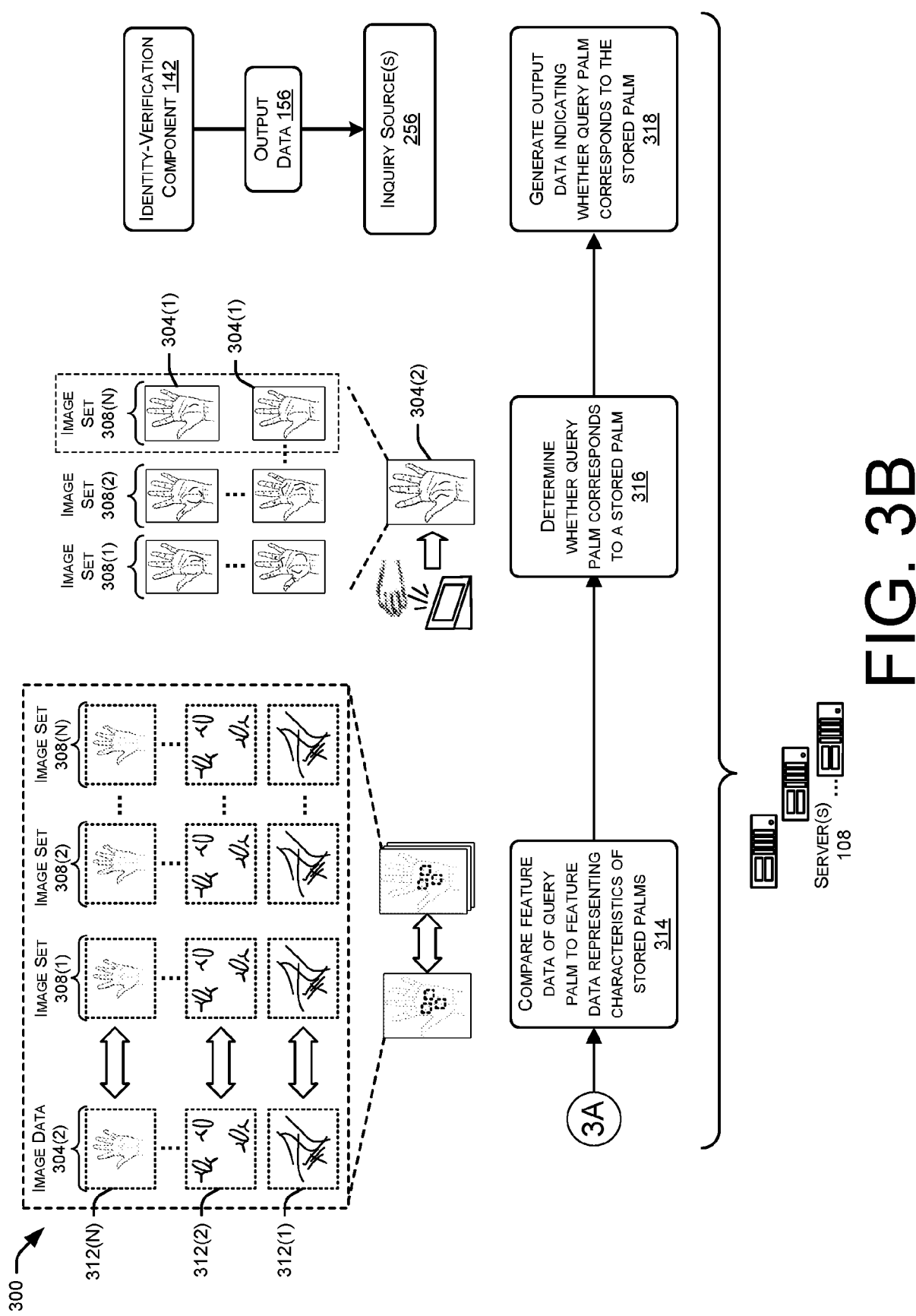

FIGS. 3A-3B collectively illustrate an example process for enrolling a user in the user-recognition system of FIG. 1, as well as verifying the identity of the user thereafter using characteristic-based analysis of the query palm and stored palm. In some instances, the process 300 may be performed in whole or in part by one or more components accessible by the servers 108. At 302, the servers 108 store image data and/or feature data generated based on the image data in an image database 144 for a user of the user-recognition system. For example, the servers 108 may receive, from the user-recognition device 104 or another device, image data 304(1) of a palm or other portion of the user and may generate featured data (e.g., in the form of a feature vector) using the image data. The servers 108 may thereafter store the image data 304(1) and/or the feature data in the image database 144. It is to be appreciated that while the illustrations depict the storing (and in some instances comparing) of image data rather than feature data, this is for ease of illustration and in other instances feature vectors or other forms of feature data may additionally or alternatively be stored and/or compared.

At 306, the servers 108 may receive additional image data 304(2) and/or corresponding feature data at a later time and may attempt to identify a user by matching the additional feature data to feature data stored in the image database 144. For example, FIG. 3A illustrates that the image data 304(2) (and/or the corresponding feature data) may be compared to image data and/or feature data associated with a first image set 308(1), to image data and/or feature data associated with a second image set 308(2), to image data and/or feature data associated with a "$N^{th}$" image set 308(N), and so forth. In this example, the servers 108 determine, based on the comparison, that the image data 304(2) corresponds to the image set 308(N) and, thus, to the corresponding user.

In some examples, the servers 108 may identify one or more image sets 308 that correspond to the image data 304(2), but correspond by less than a threshold confidence level for associating a transaction with one of the user profiles 308.

In such examples, at 310, the servers 108 may generate feature data 312(1)-312(N), or characteristics, representing characteristics of a palm depicted in the image data 304(1). The feature data 312 may comprise any type of characteristic represented in a palm and/or discussed herein.

At 314, the servers 108 may compare the feature data to image sets 308(1)-308(N). For instance, the characteristic-correspondence component 246 may compare the feature data 312 of the image data 304(2) with respective feature data for the image sets 308(1)-308(N). The characteristic-correspondence component 246 may determine measures of similarity for the different characteristics compared by the characteristic-correspondence component 246.

At 316, the servers 108 may determine whether the image data 304(2) representing the query palm corresponds to image set 308(N) representing a stored palm. For instance, the decision-fuser component 250 may combine the measures of similarity determined for each characteristic-based analysis between the feature data representing the image data 304(2) and the feature data corresponding to the image set 308(N) to determine an overall measure of similarity. The decision-fuser component 250 may determine that the overall measure of similarity is greater than or equal to a threshold measure of similarity (e.g., 95%, 100%, etc.). In this way, the decision-fuser component 250 may determine whether the query palm depicted in the image data 304(2) is that of a user associated with the stored image set 308(N).

At 318, the servers 108 may generate output data 156 indicating whether or not the query palm corresponds to the stored palm 318, or if the servers 108 are unsure whether the stored palm corresponds to the query palm.

Figure 4:
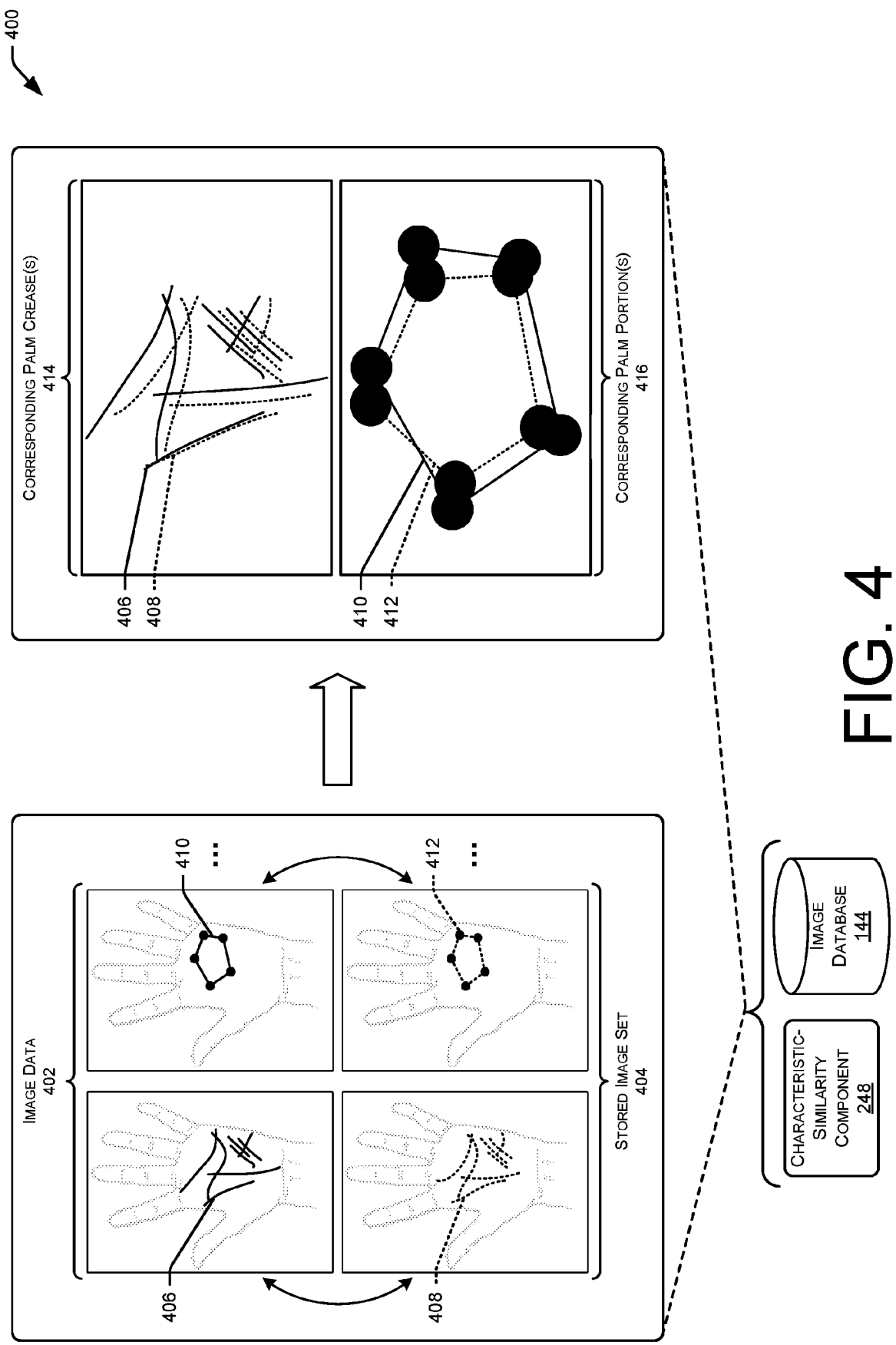
FIG. 4 illustrates an example scenario where a characteristic-similarity component determines similarities between characteristics of a user's palm represented in image data and characteristics of a stored palm stored in a database.

FIG. 4 illustrates an example scenario 400 where a characteristic-similarity component 248 determines similarities between features of a user's palm represented in image data 402 and features of a stored palm of a stored image set 404.

At illustrated, the characteristic-similarity component 248 may receive a characteristic 406 for the query palm and characteristic 408 for a stored palm of a stored image set 404. The characteristics 406 and 408 may, in some examples, comprise shapes, orientations, junctions, and/or orientations of creases in the query and stored palms, respectively. Similarly, the characteristic-similarity component 248 may receive another characteristic 410 for the query palm depicted in the image data 402 and another characteristic 412 for the stored palm of the stored image set 404. The characteristics 410 and 412 may comprise spatial graphs representing locations/relationships of patches of the palms, and/or other types of characteristics.

The characteristic-similarity component 248 may analyze feature data representing each of the characteristics 406 and 408 with reference to each other and determine corresponding palm crease(s) 414 for the stored and query palms. The characteristic-similarity component 248 may analyze the corresponding palm crease(s) 414 to calculate a measure of similarity for the characteristics 406 and 408 based on similarities in the shapes, orientations, junctions, and/or orientations of creases in the query and stored palms.

Similarity, the characteristic-similarity component 248 may analyze feature data representing each of the characteristics 410 and 412 with reference to each other and determine corresponding palm characteristics 416 for the stored and query palms. The characteristic-similarity component 248 may analyze the corresponding palm patch(es) 416 represented in the spatial graphs and determine similarities between the locations/relationships of patches of the palms, and/or other types of evidence markings, represented in the corresponding palm patch(es) 416. The characteristic-similarity component 248 may calculate a measure of similarity for the characteristics 410 and 412 based on the similarities between the spatial graphs that indicate how similar the locations of corresponding portions on the query and stored palms are with respect to each other.

Using these similarity scores, and/or other similarity scores determined using additional or alternative types of characteristics, the decision-fuser component 250 may determine an overall similarity score and determine whether the query palm depicted in the image data 402 belongs to the user associated with the stored image set 404. For instance, the characteristic-similarity component 248 may determine whether the overall similarity score is greater than or equal to a threshold similarity score. It should be appreciated that this is simply a few types of characteristics, and any additional or alternative types of characteristics or number of characteristics may be utilized.

Figure 5:
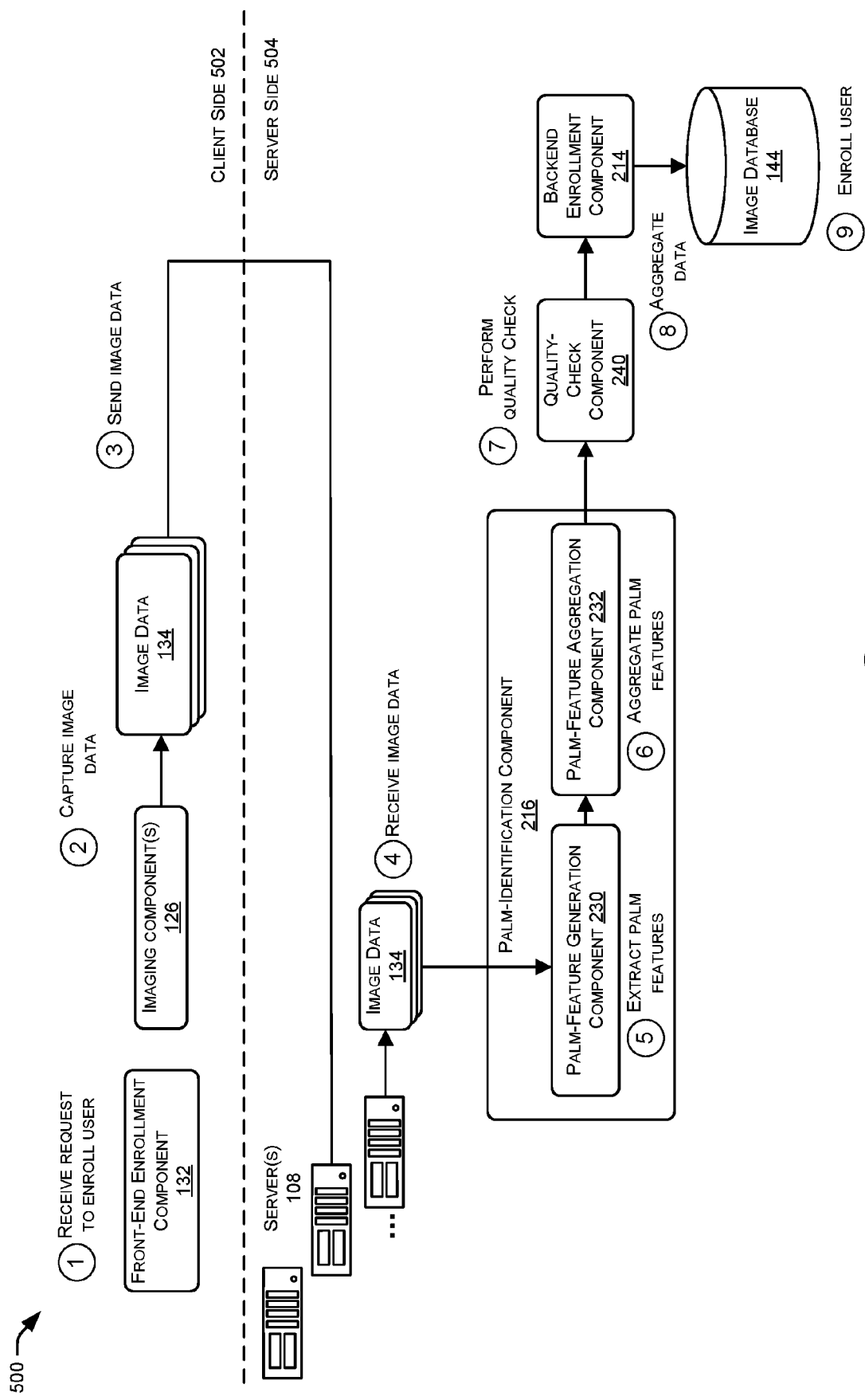
FIG. 5 illustrates an example environment including a block diagram of one or more servers configured to support at least a portion of the functionality of a user-recognition system, as well as an example flow of data within the system for enrolling a user with the user-recognition system.

FIG. 5 illustrates an example environment 500 including block diagram of one or more servers 108 configured to support at least a portion of the functionality of a user-recognition system, as well as an example flow of data within the system for enrolling a user 106 for use of the user-recognition system.

As illustrated, the environment 500 includes a client side 502 and a server side 504. However, this is merely illustrative, and some or all of the techniques may be performed entirely on the client side 502, or entirely on the server side 504. At "1," a front-end enrollment component 132 may receive a request to enroll a user 106 for use of the user-recognition system. For example, the request may comprise various types of input, such as a selection made via an I/O interface 128 (e.g., touch screen, mouse, keyboard, etc.) of a user interface element presented on a display for starting an enrollment process. Additionally, the front-end enrollment component 132 may detect a speech utterance from the user 106 indicating a request to enroll (e.g., "please enroll me," "I would like to check out," etc.). Another request example may include the user 106 sliding a user ID card into an I/O interface 128, such as a credit card, driver's license, etc. However, any type of input may be detected as a request by the front-end enrollment component 132.

Upon receiving the request to enroll, the front-end enrollment component 132 may activate or otherwise utilize the imaging component(s) 126 to generate image data 134 representing a palm of the user 106. At "2," the user-recognition device 104 then captures image data 134 and, at "3", sends the image data 134 to the server(s) 108. For instance, the user-recognition device 104 may encode and send the audio data 142 and image data 134 over the network(s) 138 to the server(s) 108. Further, in some instances some of the images may be removed if there are not in focus, do not have a threshold level of discriminability of the characteristics of the palm of the user, or the like. This removal may occur on the client side 502 and/or the server side 504.

At "4," the servers receive the image data and, at "5", the palm-feature generation component 230 may extract palm-feature data 218 from the image data 134. In some examples, prior to extracting the palm-feature data 218, the palm-feature generation component 230 may perform various operations for processing the image data 134 prior to extracting the palm-feature data 218. For instance, the palm-feature generation component 230 may initially perform user detection to determine that the image data 134 represents a palm of a user 106. For instance, the palm-feature generation component 230 may utilize an Integrated Sensor Processor (ISP) that performs hardware-based user detection techniques. In some examples, various software techniques may additionally, or alternatively be performed. In either instance, a bounding box may be output around the detected hand of the user 106 for an image depicting at least a portion of the user 106 and represented by the image data 134. Further, the palm-feature generation component 230 may perform hand-pose estimation in order to align the palm of the user 106 with a common coordinate system. After aligning the image of the hand into a common coordinate section, the portion of the image data corresponding to the palm may be identified and cropped. This remaining portion of the image data may thereafter be used to extract features therefrom by, for example, running a neural network on the cropped section of the image data. In some examples, hand-pose estimation may improve the extraction of features representing the palm of the user 106. Once the hand of the user 106 has been aligned, the palm-feature generation component 230 may extract features (e.g., palm-feature data 218) from the image data 134. In some examples, the trained model(s) 228 may utilize a triples loss function which converts image data 134 into a feature embedding in a metric space (e.g., palm-feature data 218), which may allow for comparisons with subsequent feature vectors using, for example, squared distance calculation.

At "6," the palm-feature aggregation component 232 may aggregate feature data (e.g., palm-feature data 218) from various image data 134. For instance, the image data 134 may represent the hand of the user 106 at different angles, under different lighting conditions, or other differing characteristics. The palm-feature aggregation component 232 may aggregate the palm-feature data 218 together, such as by averaging out feature vectors.

At "7," the quality-check component 240 may perform a quality check on the palm-feature data. For example, the quality-check component 240 may utilize a trained model(s) 228 to determine an overall metric of the quality of the extracted palm-feature data 218. If the overall metric is poor, or below a threshold quality level, the user-recognition system may request to acquire additional image data 134. In addition, or in the alternative, the quality-check component 240 may perform a de-duping process to ensure that the user associated with the palm-feature data hasn't already enrolled in the system. If the overall quality metric is good or acceptable, and if the de-duping process does not reveal that the user has previously enrolled in the system, the backend enrollment component 214 may aggregate the data at "8."

For example, at "8" the backend-enrollment component 214 may aggregate the palm-feature data 218 and enroll the user at "9" in the image database 144. The backend-enrollment component 214 may store associations (e.g., mappings) between the palm-feature data 218 with a user profile 254 of the user 106 requesting to be enrolled for use of the user-recognition system.

Figure 6:
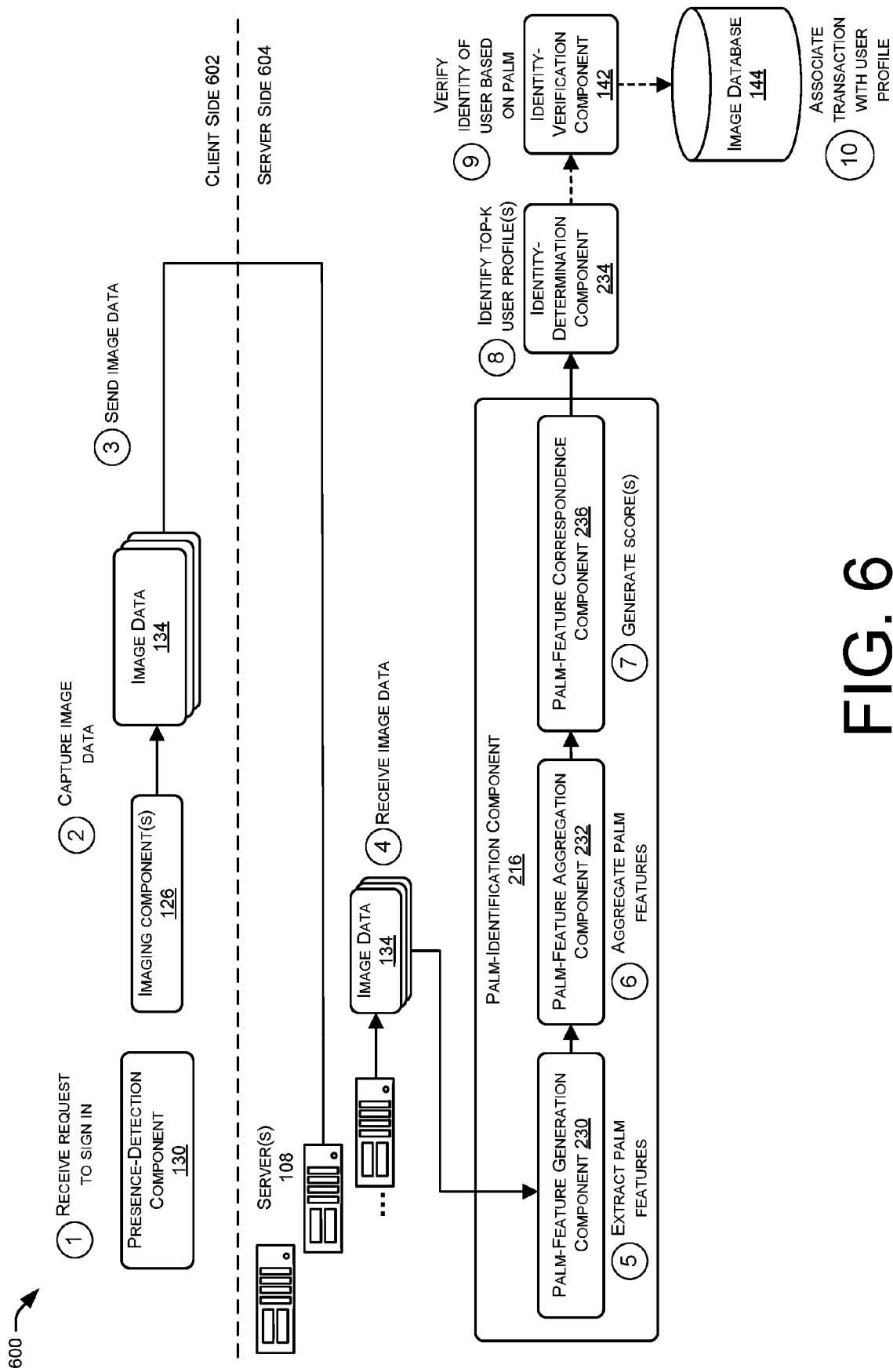
FIG. 6 illustrates an example environment including a block diagram of one or more servers configured to support at least a portion of the functionality of a user-recognition system as well as an example flow of data within the system for identifying a user of the user-recognition system, and verifying the identity of the user thereafter using characteristic-based analysis of a query palm and a stored palm.

FIG. 6 illustrates an example environment 600 including a block diagram of one or more servers 108 configured to support at least a portion of the functionality of a user-recognition system, as well as an example flow of data within the system for identifying a user 106 of the user-recognition system and verifying the identity of the user thereafter using portion-based analysis of the palm and a user profile. As illustrated, the environment 600 includes a client side 602 and a server side 604. However, this is merely illustrative, and some or all of the techniques may be performed entirely on the client side 602, or entirely on the server side 604.

At "1," a user requests to sign in with the user-recognition system. For example, the presence-detection component 130 may be executable by the processor(s) 120 to detect a trigger indicating presence of the user 106. The trigger detected by the presence-detection component 130 may comprise one or more types of input. For instance, the presence-detection component 130 may include logic to detect, using one or more imaging components 126, a portion of a user 106 (e.g., a hand over the imaging component(s) 126 of the user-recognition device 104). Other examples of triggers detected by the presence-detection component 130 that may indicate the presence of the user 106 may include receiving touch input (or other input, such as a mouse click) via one or more I/O interfaces 128 of the user-recognition device 104. However, any type of input may be detected as a trigger by the presence-detection component 130.

Upon identifying the request to sign in from the user, at "2" one or more imaging components 126 may generate image data 134 representing a palm of the user 106 and/or another portion of the user. At "3," the user-recognition device 104 may send the image data 134 to the server(s) 108. For instance, the user-recognition device 104 may encode and send the image data 134 over the network(s) 138 to the server(s) 108. Again, some of the image data 134 may be discarded based on the image data being out of focus, having a discriminability that is less than the threshold, and/or the like.

At "4," the servers may receive the image data 134 and, at "5", the palm-feature generation component 230 may extract palm-feature data 218 from the image data 134. In some examples, prior to extracting the palm-feature data 218, the palm-feature generation component 230 may perform various operations for processing the image data 134 prior to extracting the palm-feature data 218. For instance, the palm-feature generation component 230 may initially perform palm detection to determine that the image data 134 represents a hand of a user 106. For instance, the palm-feature generation component 230 may utilize an Integrated Sensor Processor (ISP) that performs hardware-based user detection techniques. In some examples, various software techniques may additionally, or alternatively be performed. In either instance, a bounding box may be output around the detected hand of the user 106 for an image depicting the user 106 and represented by the image data 134. Further, the palm-feature generation component 230 may perform hand pose estimation to align the face of the user 106 with a common coordinate system. In some examples, hand pose estimation may improve the extraction of features representing the hand of the user 106. Once the hand of the user 106 has been aligned, the palm-feature generation component 230 may extract features (e.g., palm-feature data 218) from the image data 134. In some examples, the trained model(s) 228 may utilize a triplet loss function which converts the image data 134 into a feature embedding in a metric space (e.g., palm-feature data 218), which may allow for comparisons with subsequent feature vectors using, for example, squared distance calculation.

At "6," the palm-feature aggregation component 232 may aggregate feature data (e.g., palm-feature data 218) from various image data 134. For instance, the image data 134 may represent the hand of the user 106 at different angles, under different lighting conditions, or other differing characteristics. The palm-feature aggregation component 232 may aggregate the palm-feature data 218 together, such as by averaging out feature vectors.

At "7," the palm-feature correspondence component 236 may generate one or more scores indicating a similarity between the aggregated features associated with the image data 134 and respective feature data stored in association with respective user profiles. In some examples, these correspondence scores may be determined, at least in part, on "distances" between the feature vector associated with the image data and respective feature vectors of the respective palm-feature data 218 stored in association with user profiles in the image database 144.

At "8," the identity-determination component 234 may determine the top-K user profiles 254 based on the correspondence scores. For example, the identity-determination component 234 may identity the user profile(s) 254 associated with the feature vectors having the closest distances to the feature vector associated with the image data 134.

At "9", the identity-verification component 142 may verify the identity of the user based on the query palm depicted in the image data 134. For instance, the identity-verification component 142 may perform the techniques described herein for performing portion-based analysis of the image data 134 with reference to the feature data associated with the user profiles 254 in the image database 144.

At "10", the servers 108 may associate a transaction with the user profile 254 determined to correspond to the image data 134. For instance, one or more items taken by the user 106 during a session in a facility 102 may be charged to the user profile 254.

Figure 7A:
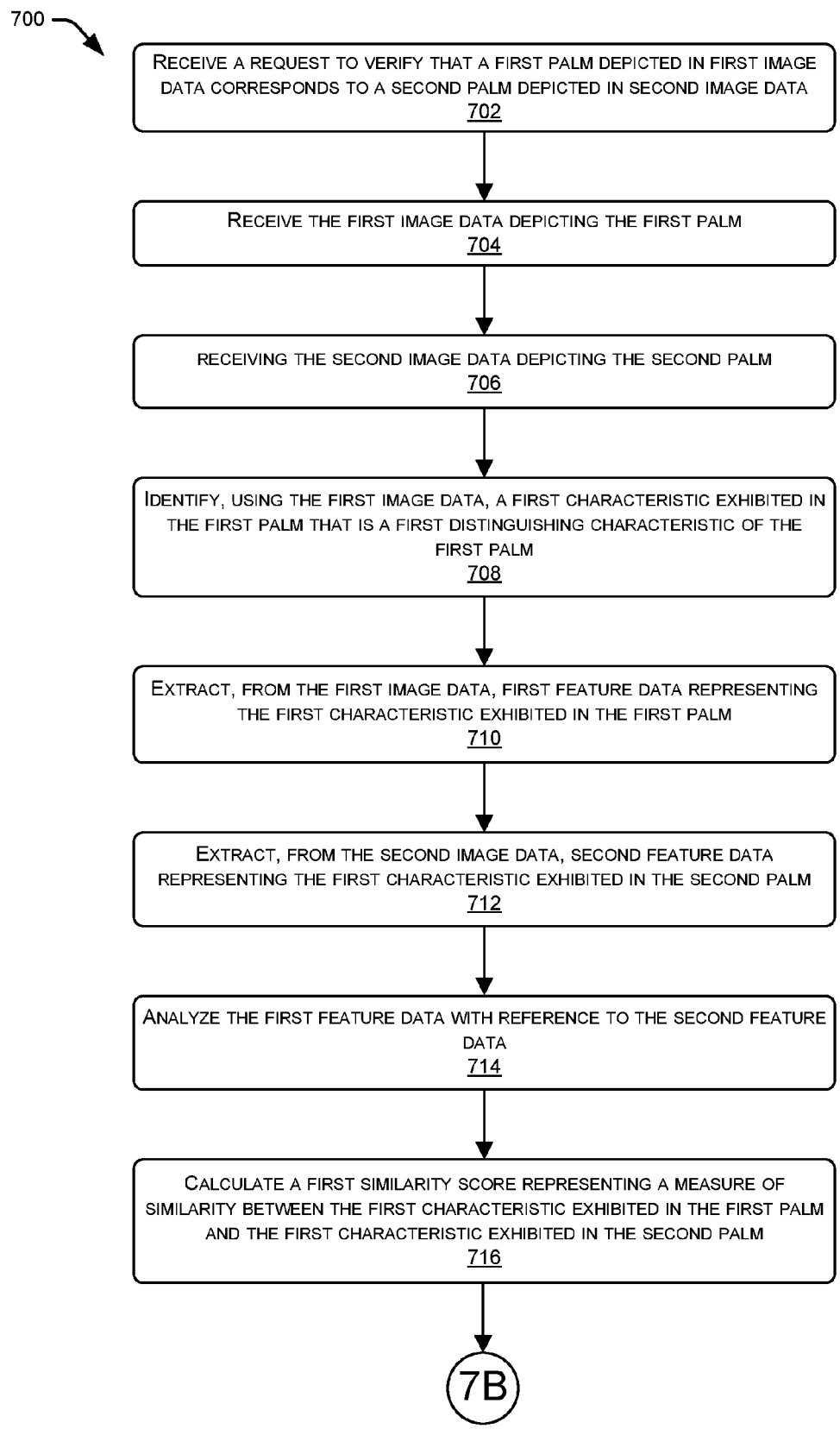
FIGS. 7A and 7B collectively illustrate a flow diagram of an example process for verifying the identity of the user thereafter using characteristic-based analysis of a query palm of the user and a stored palm.
Figure 7B:
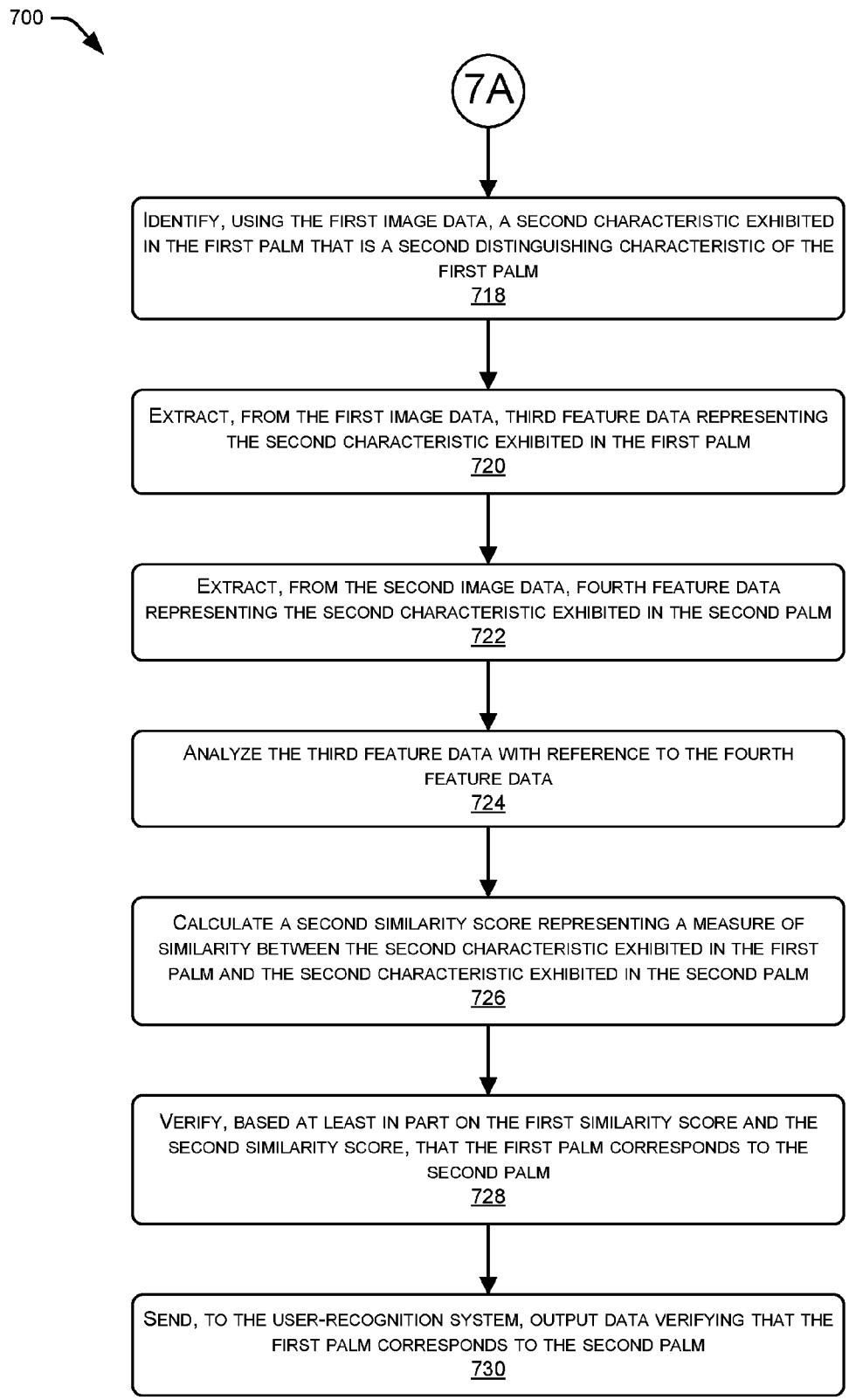
Figure 8:
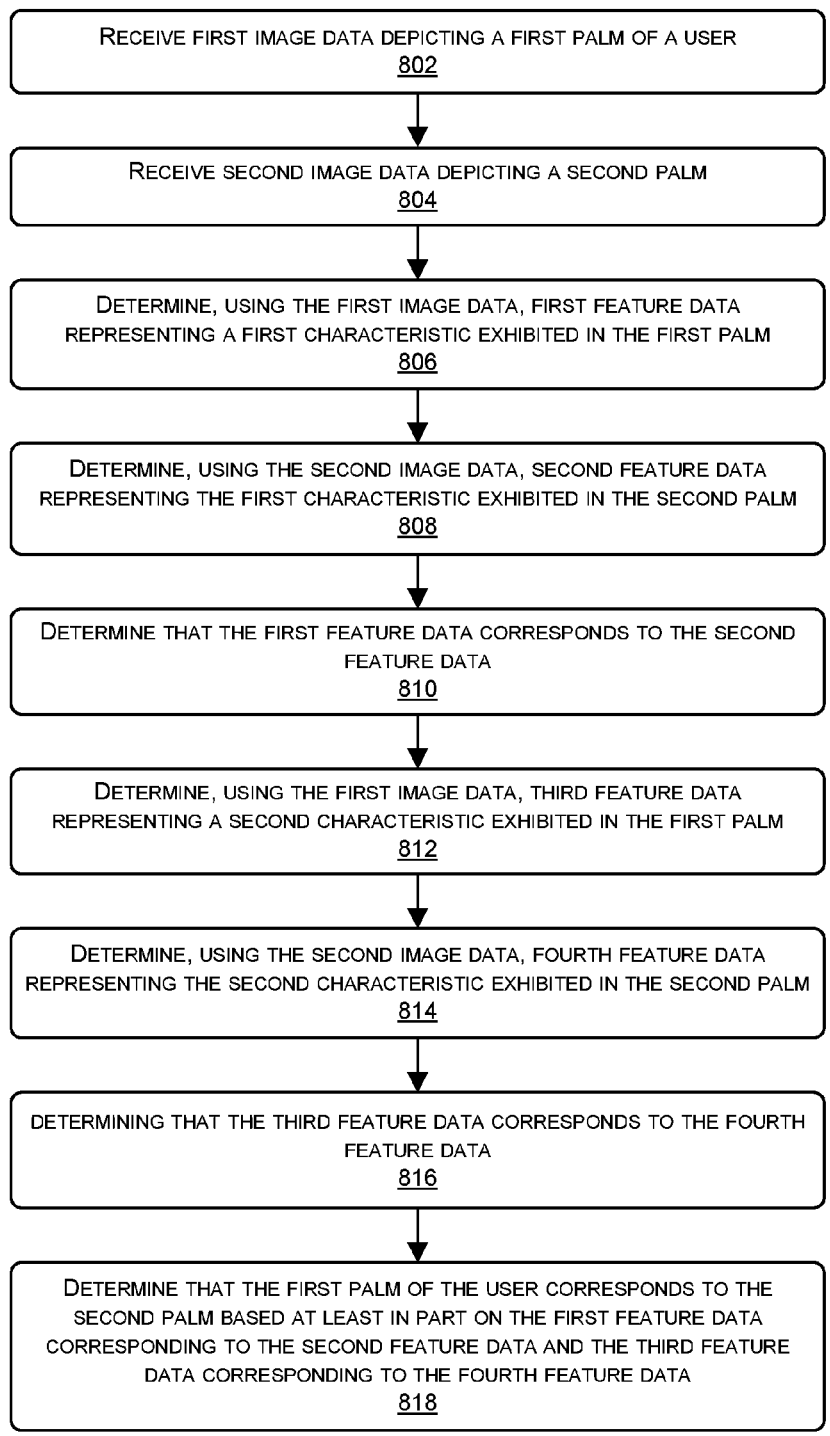
FIG. 8 illustrates another flow diagram of an example process for verifying the identity of the user thereafter by identifying and analyzing salient characteristics of a query palm of the user and a stored palm.

FIGS. 7A, 7B, and FIG. 8 illustrate flow diagram of an example processes 700 and 800, respectively, for verifying the identity of the user thereafter using portion-based analysis of the palm of the user and a user profile. The processes 700 and 800, as well as the additional processes discussed herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. In some instances, the processes described herein may be performed, in whole or in part, by the servers 108, the user-recognition device 104, and/or a combination thereof.

Although processes 700 and 800 are described as being performed at servers, the techniques may be applied by any system of devices with one or more processors. For instance, the techniques may be performed, partly or in their entirety, by a device that captures the image data (e.g., user-recognition device 104). The system that performs the processes described herein, including 700 and 800, may be performed by any type of device or source.

FIGS. 7A and 7B collectively illustrate a flow diagram of the example process 700 for verifying the identity of the user thereafter using portion-based analysis of the palm of the user and another palm.

At 702, one or more servers 108 may receive, from a user-recognition system, a request to verify that a first palm depicted in first image data corresponds to a second palm depicted in second image data. For instance, the identity-verification component 142 may receive a verification inquiry 154 from an inquiry source 256.

At 704, the server(s) 108 may receive the first image data depicting the first palm. In some examples, the first image data may depict a query palm, a stored image of a palm, and/or another palm/

At 706, the server(s) 108 may receive the second image data depicting the second palm. In some examples, the second palm may be a stored palm, a stored image of a palm in a database, or another palm.

At 708, the server(s) 108 may identify, using the first image data, a first characteristic exhibited in the first palm that is a first distinguishing characteristic of the first palm. For instance, the first characteristic may be distinguishable or unique from other characteristics in the first palm. The first characteristic may be exhibited in a first portion of the palm that is less than an entirety of the first palm. In this way, a first component that analyzes the first characteristic (e.g., verification source 258) may be provided with less than all of the firs image data.

At 710, the server(s) 108 may extract, from the first image data, first feature data representing the first characteristic exhibited in the first palm. At 712, the server(s) 108 may extract, from the second image data, second feature data representing the first characteristic exhibited in the second palm.

At 714, the server(s) 108 may analyze, by a first component associated with the system, the first feature data with reference to the second feature data. In some instances, the first component comprises a verification source 258(1) running on a computing device, a verification source 258(N) comprising a human agent to analyze the feature data, and/or another verification source 258. The verification source 258 may be provided with less than all of feature data representing the first and second image data.

At 716, the server(s) 108 may calculate, based at least in part on the analyzing the first feature data, a first similarity score representing a measure of similarity between the first characteristic exhibited in the first palm and the first characteristic exhibited in the second palm.

At 718, the server(s) 108 may identify, using the first image data, a second characteristic exhibited in the first palm that is a second distinguishing characteristic of the first palm the second characteristic being exhibited in a second portion of the palm that is less than an entirety of the first palm.

At 720, the server(s) 108 may extract, from the first image data, third feature data representing the second characteristic exhibited in the first palm. At 722, the server(s) 108 may extract, from the second image data, fourth feature data representing the second characteristic exhibited in the second palm.

At 724, the server(s) 108 may analyze, by a second component associated with the system, the third feature data with reference to the fourth feature data, wherein the second component is communicatively isolated from the first component. The second component may not exchange feature data with the first component, and may comprise a verification source configured to analyze portions of image data or feature data that represent less than all of a palm or hand of a user.

At 726, the server(s) 108 may calculate, based at least in part on the analyzing the third feature data, a second similarity score representing a measure of similarity between the second characteristic exhibited in the first palm and the second characteristic exhibited in the second palm.

At 728, the server(s) 108 may verify, based at least in part on the first similarity score and the second similarity score, that the first palm corresponds to the second palm. At 730, the server(s) 108 may send, to the user-recognition system, output data verifying that the first palm corresponds to the second palm.

In some examples, the first characteristic of the first palm comprises at least one of a crease in the first palm, a shape of the crease, a junction of multiple creases in the first palm, veins in the first palm, a pattern of creases in the first palm, a palm print of the first palm, a shape of a hand in which the first palm is included, a shape of a finger associated with the first palm, or a marking on the palm. Further, the second characteristic of the first palm comprises at least a different one of the crease, the shape of the crease, the junction of multiple creases in the first palm, the veins in the first palm, the pattern of creases in the first palm, the palm print of the first palm, the shape of the hand in which the first palm is included, the shape of a finger associated with the first palm, or the marking on the palm.

In some instances, the first characteristic is exhibited in a first patch on the first palm and the second characteristic is exhibited in a second patch on the first palm. In such examples, the process 700 may further comprise determining that a distance between a first location associated with the first patch and a second location associated with the second patch on the first palm is greater than or equal to a threshold distance, and identifying the second characteristic exhibited in the first palm for analysis based at least in part on the distance being greater than or equal to the threshold distance.

In some examples, the process 700 may further comprise generating the request to verify that the first palm corresponds to the second palm based at least in part on at least one of: (i) determining, by the user-recognition system, that an initial confidence score indicating that the first palm corresponds to the second palm is less than a threshold confidence score; or (ii) receiving, at the user-recognition system and from a user profile, an initial request to verify an initial determination that the first palm corresponds to the second palm.

FIG. 8 illustrates another flow diagram of the example process 800 for verifying the identity of the user thereafter by identifying and analyzing salient portions of a palm of the user and a user profile.

At 802, one or more servers 108 may receive receiving first image data depicting a first palm of a user. At 804, the server(s) 108 may receive second image data depicting a second palm. At 806, the server(s) 108 may determine, using the first image data, first feature data representing a first characteristic exhibited in the first palm, wherein the first feature data represents a first portion of the first image data that is less than all of the first image data.

At 808, the server(s) 108 may determine, using the second image data, second feature data representing the first characteristic exhibited in the second palm. At 810, the server(s) 108 may determine, by a first verification source, that the first feature data corresponds to the second feature data. At 812, the server(s) 108 may determine using the first image data, third feature data representing a second characteristic exhibited in the first palm, wherein the third feature data represents a second portion of the first image data that is less than all of the first image data.

At 814, the server(s) 108 may determine, using the second image data, fourth feature data representing the second characteristic exhibited in the second palm. At 816, the server(s) 108 may determine, by a second verification source remote from the first verification source, that the third feature data corresponds to the fourth feature data. At 818, the server(s) 108 may determine that the first palm of the user corresponds to the second palm based at least in part on the first feature data corresponding to the second feature data and the third feature data corresponding to the fourth feature data.

In some examples, the techniques described herein may include receiving first image data depicting a first palm, and receiving second image data depicting a second palm. The images may be stored in a database and processed offline or out-of-band, or the images may be received during a process for identify a user in real-time or near-real-time.

Further, the techniques may include identifying a first portion of the first image data depicting a first characteristic exhibited in the first palm, the first portion of the first image data being less than all of the first image data (e.g., a sub-portion of the first image data), and identifying a second portion of the second image data depicting the first characteristic exhibited in the second palm.

The techniques may include determining, by a first verification source 258 of the system, that the first portion of the first image data corresponds to the second portion of the second image data. In some examples, the techniques may include sending the first portion of the image data and a second portion of the second image data to the first verification source, such as a human agent, a separate computing device/server, a separate system, etc. The techniques may further include receiving an indication that the first portion of the first image data corresponds to the second portion of the second image data Additionally, the techniques may include identifying a third portion of the first image data depicting a second characteristic exhibited in the first palm, the third portion of the first image data being less than all of the first image data. Additionally, the techniques may include identifying a fourth portion of the second image data depicting the second characteristic exhibited in the second palm.

Further, the system may determine, by a second verification source of the system that is different from the first verification source, that the third portion of the first image data corresponds to the fourth portion of the second image data. The second verification source may be remote (e.g., physically separate, a separate network, separate device, separate entity, etc.) from the first verification source. The first and second verification sources 258 may compare portions of the images that are less than all of the images (e.g., patches of palms, patches of veins, etc.) such that no entity that analyzes the images are provided with all of the images representing the palms.

The system may then determine that the first palm corresponds to the second palm based at least in part on determining that the first portion of the first image data corresponds to the second portion of the second image data and the third portion of the first image data corresponds to the fourth portion of the second image data.

Thus, the identity-verification system/component 142 may breaks down the top-level palm identity verification task in a set of simpler patch-based sameness verification tasks. This segregation of the palm comparison into smaller, patch-based comparisons increases the efficiency of palm comparisons, thereby reducing time and computing resources for automated systems. Additionally, in instances where a human auditor is involved, the segregation of information increases security by providing less palm information to a human auditor.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

Figure 9:
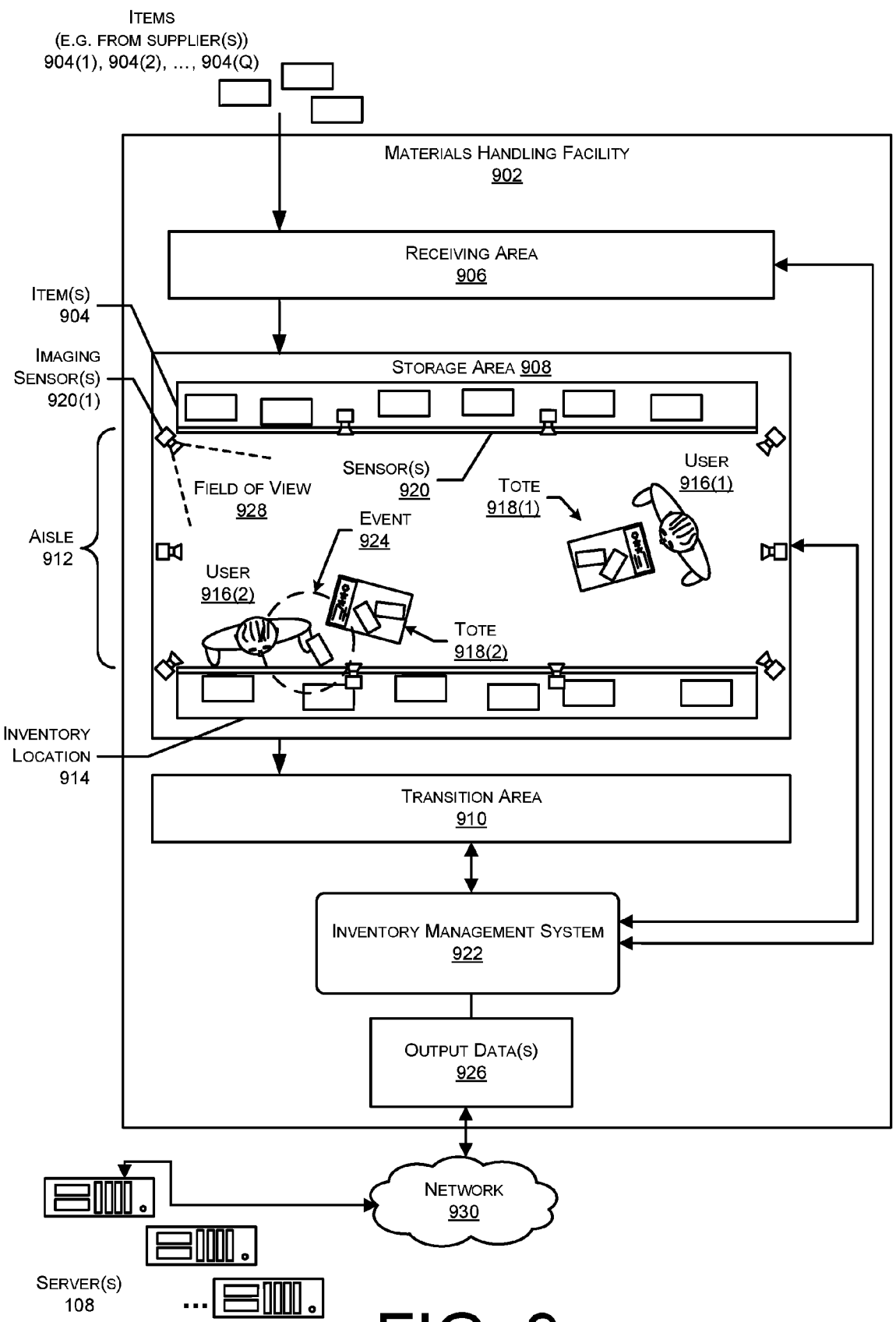
FIG. 9 is a block diagram of an example materials handling facility that includes sensors and an inventory management system configured to generate output regarding events occurring in the facility using the sensor data.

FIG. 9 is a block diagram of an example materials handling facility 902 that includes sensors and an inventory management system configured to generate output regarding events occurring in the facility using the sensor data. The materials handling facility 902 may comprise any type of facility, such as the materials handling facility 102, in which the techniques described herein may be applied to cameras monitoring the environments as described below. However, the following description is merely one illustrative example of an industry and environment in which the techniques described herein may be utilized.

An implementation of a materials handling facility 902 (e.g., facility 102) configured to store and manage inventory items is illustrated in FIG. 12. A materials handling facility 902 (facility) comprises one or more physical structures or areas within which one or more items 904(1), 904(2), ..., 904 (Q) (generally denoted as 904) may be held. As used in this disclosure, letters in parenthesis such as "(Q)" indicate an integer result. The items 904 comprise physical goods, such as books, pharmaceuticals, repair parts, electronic gear, groceries, and so forth.

The facility 902 may include one or more areas designated for different functions with regard to inventory handling. In this illustration, the facility 902 includes a receiving area 906, a storage area 908, and a transition area 910. The receiving area 906 may be configured to accept items 904, such as from suppliers, for intake into the facility 902. For example, the receiving area 906 may include a loading dock at which trucks or other freight conveyances unload the items 904.

The storage area 908 is configured to store the items 904. The storage area 908 may be arranged in various physical configurations. In one implementation, the storage area 908 may include one or more aisles 912. The aisle 912 may be configured with, or defined by, inventory locations 914 on one or both sides of the aisle 912. The inventory locations 914 may include one or more of shelves, racks, cases, cabinets, bins, floor locations, or other suitable storage mechanisms for holding or storing the items 904. The inventory locations 914 may be affixed to the floor or another portion of the facility's structure, or may be movable such that the arrangements of aisles 912 may be reconfigurable. In some implementations, the inventory locations 914 may be configured to move independently of an outside operator. For example, the inventory locations 914 may comprise a rack with a power source and a motor, operable by a computing device to allow the rack to move from one location within the facility 902 to another.

One or more users 916(1), 916(2), ..., 916(U), totes 918 (1), 918(2), ..., 918(T) (generally denoted as 918) or other material handling apparatus may move within the facility 902. For example, the users 916 may move about within the facility 902 to pick or place the items 904 in various inventory locations 914, placing them on the totes 918 for ease of transport. An individual tote 918 is configured to carry or otherwise transport one or more items 904. For example, a tote 918 may include a basket, a cart, a bag, and so forth. In other implementations, other agencies such as robots, forklifts, cranes, aerial drones, and so forth, may move about the facility 902 picking, placing, or otherwise moving the items 904.

One or more sensors 920 may be configured to acquire information in the facility 902. The sensors 920 in the facility 902 may include sensors fixed in the environment (e.g., ceiling-mounted cameras) or otherwise, such as sensors in the possession of users (e.g., mobile phones, tablets, etc.). The sensors 920 may include, but are not limited to, cameras 920(1), weight sensors, radio frequency (RF) receivers, temperature sensors, humidity sensors, vibration sensors, and so forth. The sensors 920 may be stationary or mobile, relative to the facility 902. For example, the inventory locations 914 may contain cameras 920(1) configured to acquire images of pick or placement of items 904 on shelves, of the users 916 (1) and 916(2) in the facility 902, and so forth. In another example, the floor of the facility 902 may include weight sensors configured to determine a weight of the users 916 or other object thereupon.

During operation of the facility 902, the sensors 920 may be configured to provide information suitable for identifying new locations of objects or other occurrences within the facility 902. For example, a series of images acquired by a camera 920(1) may indicate removal of an item 904 from a particular inventory location 914 by one of the users 916 and placement of the item 904 on or at least partially within one of the totes 918.

While the storage area 908 is depicted as having one or more aisles 912, inventory locations 914 storing the items 904, sensors 920, and so forth, it is understood that the receiving area 906, the transition area 910, or other areas of the facility 902 may be similarly equipped. Furthermore, the arrangement of the various areas within the facility 902 is depicted functionally rather than schematically. For example, multiple different receiving areas 906, storage areas 908, and transition areas 910 may be interspersed rather than segregated in the facility 902.

The facility 902 may include, or be coupled to, an inventory management system 922. The inventory management system 922 is configured to identify interactions with and between users 916, devices such as sensors 920, robots, material handling equipment, computing devices, and so forth, in one or more of the receiving area 906, the storage area 908, or the transition area 910. These interactions may include one or more events 924. For example, events 924 may include the entry of the user 916 to the facility 902, stocking of items 904 at an inventory location 914, picking of an item 904 from an inventory location 914, returning of an item 904 to an inventory location 914, placement of an item 904 within a tote 918, movement of users 916 relative to one another, gestures by the users 916, and so forth. Other events 924 involving users 916 may include the user 916 providing authentication information in the facility 902, using a computing device at the facility 902 to authenticate identity to the inventory management system 922, and so forth. Some events 924 may involve one or more other objects within the facility 902. For example, the event 924 may comprise movement within the facility 902 of an inventory location 914, such as a counter mounted on wheels. Events 924 may involve one or more of the sensors 920. For example, a change in operation of a sensor 920, such as a sensor failure, change in alignment, and so forth, may be designated as an event 924. Continuing the example, movement of a camera 920(1) resulting in a change in the orientation of the field of view 928 (such as resulting from someone or something bumping the camera 920(1)) (e.g. camera) may be designated as an event 924.

By determining the occurrence of one or more of the events 924, the inventory management system 922 may generate output data 926. The output data 926 comprises information about the event 924. For example, where the event 924 comprises an item 904 being removed from an inventory location 914, the output data 926 may comprise an item identifier indicative of the particular item 904 that was removed from the inventory location 914 and a user identifier of a user that removed the item.

The inventory management system 922 may use one or more automated systems to generate the output data 926. For example, an artificial neural network, one or more classifiers, or other automated machine learning techniques may be used to process the sensor data from the one or more sensors 920 to generate output data 926. The automated systems may operate using probabilistic or non-probabilistic techniques. For example, the automated systems may use a Bayesian network. In another example, the automated systems may use support vector machines to generate the output data 926 or the tentative results. The automated systems may generate confidence level data that provides information indicative of the accuracy or confidence that the output data 926 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 105%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 904, user 916, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 916 may pick an item 904(1) such as a perfume bottle that is generally cubical in shape from the inventory location 914. Other items 904 at nearby inventory locations 914 may be predominately spherical. Based on the difference in shape (cube vs. sphere) from the adjacent items, and the correspondence in shape with the previously stored image of the perfume bottle item 904(1) (cubical and cubical), the confidence level that the user 106 has picked up the perfume bottle item 904(1) is high.

In some situations, the automated techniques may be unable to generate output data 926 with a confidence level above a threshold result. For example, the automated techniques may be unable to distinguish which user 916 in a crowd of users 916 has picked up the item 904 from the inventory location 914. In other situations, it may be desirable to provide human confirmation of the event 924 or of the accuracy of the output data 926. For example, some items 904 may be deemed age restricted such that they are to be handled only by users 916 above a minimum age threshold.

In instances where human confirmation is desired, sensor data associated with an event 924 may be processed to generate inquiry data. The inquiry data may include a subset of the sensor data associated with the event 924. The inquiry data may also include one or more of one or more tentative results as determined by the automated techniques, or supplemental data. The subset of the sensor data may be determined using information about the one or more sensors 920. For example, camera data such as the location of the camera 920(1) within the facility 902, the orientation of the camera 920(1), and a field of view 928 of the camera 920(1) may be used to determine if a particular location within the facility 902 is within the field of view 928. The subset of the sensor data may include images that may show the inventory location 914 or that the item 904 was stowed. The subset of the sensor data may also omit images from other cameras 920(1) that did not have that inventory location 914 in the field of view 928. The field of view 928 may comprise a portion of the scene in the facility 902 that the sensor 920 is able to generate sensor data about.

Continuing the example, the subset of the sensor data may comprise a video clip acquired by one or more cameras 920(1) having a field of view 928 that includes the item 904. The tentative results may comprise the "best guess" as to which items 904 may have been involved in the event 924. For example, the tentative results may comprise results determined by the automated system that have a confidence level above a minimum threshold.

The facility 902 may be configured to receive different kinds of items 904 from various suppliers and to store them until a customer orders or retrieves one or more of the items 904. A general flow of items 904 through the facility 902 is indicated by the arrows of FIG. 12. Specifically, as illustrated in this example, items 904 may be received from one or more suppliers, such as manufacturers, distributors, wholesalers, and so forth, at the receiving area 906. In various implementations, the items 904 may include merchandise, commodities, perishables, or any suitable type of item 904, depending on the nature of the enterprise that operates the facility 902. The receiving of the items 904 may comprise one or more events 924 for which the inventory management system 922 may generate output data 926.

Upon being received from a supplier at receiving area 906, the items 904 may be prepared for storage. For example, items 904 may be unpacked or otherwise rearranged. The inventory management system 922 may include one or more software applications executing on a computer system to provide inventory management functions based on the events 924 associated with the unpacking or rearrangement. These inventory management functions may include maintaining information indicative of the type, quantity, condition, cost, location, weight, or any other suitable parameters with respect to the items 904. The items 904 may be stocked, managed, or dispensed in terms of countable, individual units or multiples, such as packages, cartons, crates, pallets, or other suitable aggregations. Alternatively, some items 904, such as bulk products, commodities, and so forth, may be stored in continuous or arbitrarily divisible amounts that may not be inherently organized into countable units. Such items 904 may be managed in terms of measurable quantity such as units of length, area, volume, weight, time, duration, or other dimensional properties characterized by units of measurement. Generally speaking, a quantity of an item 904 may refer to either a countable number of individual or aggregate units of an item 904 or a measurable amount of an item 904, as appropriate.

After arriving through the receiving area 906, items 904 may be stored within the storage area 908. In some implementations, like items 904 may be stored or displayed together in the inventory locations 914 such as in bins, on shelves, hanging from pegboards, and so forth. In this implementation, all items 904 of a given kind are stored in one inventory location 914. In other implementations, like items 904 may be stored in different inventory locations 914. For example, to optimize retrieval of certain items 904 having frequent turnover within a large physical facility 902, those items 904 may be stored in several different inventory locations 914 to reduce congestion that might occur at a single inventory location 914. Storage of the items 904 and their respective inventory locations 914 may comprise one or more events 924.

When a customer order specifying one or more items 904 is received, or as a user 916 progresses through the facility 902, the corresponding items 904 may be selected or "picked" from the inventory locations 914 containing those items 904. In various implementations, item picking may range from manual to completely automated picking. For example, in one implementation, a user 916 may have a list of items 904 they desire and may progress through the facility 902 picking items 904 from inventory locations 914 within the storage area 908, and placing those items 904 into a tote 918. In other implementations, employees of the facility 902 may pick items 904 using written or electronic pick lists derived from customer orders. These picked items 904 may be placed into the tote 918 as the employee progresses through the facility 902. Picking may comprise one or more events 924, such as the user 916 in moving to the inventory location 914, retrieval of the item 904 from the inventory location 914, and so forth.

After items 904 have been picked, they may be processed at a transition area 910. The transition area 910 may be any designated area within the facility 902 where items 904 are transitioned from one location to another or from one entity to another. For example, the transition area 910 may be a packing station within the facility 902. When the item 904 arrives at the transition area 910, the items 904 may be transitioned from the storage area 908 to the packing station. The transitioning may comprise one or more events 924. Information about the transition may be maintained by the inventory management system 922 using the output data 926 associated with those events 924.

In another example, if the items 904 are departing the facility 902 a list of the items 904 may be obtained and used by the inventory management system 922 to transition responsibility for, or custody of, the items 904 from the facility 902 to another entity. For example, a carrier may accept the items 904 for transport with that carrier accepting responsibility for the items 904 indicated in the list. In another example, a customer may purchase or rent the items 904 and remove the items 904 from the facility 902. The purchase or rental may comprise one or more events 924.

The inventory management system 922 may access or generate sensor data about the facility 902 and the contents therein including the items 904, the users 916, the totes 918, and so forth. The sensor data may be acquired by one or more of the sensors 920, data provided by other systems, and so forth. For example, the sensors 920 may include cameras 920(1) configured to acquire image data of scenes in the facility 902. The image data may comprise still images, video, or a combination thereof. The image data may be processed by the inventory management system 922 to determine a location of the user 916, the tote 918, the identity of the user 916, and so forth. As used herein, the identity of the user may represent a unique identifier of the user (e.g., name, number associated with user, username, etc.), an identifier that distinguishes the user amongst other users being identified with the environment, or the like.

The inventory management system 922, or systems coupled thereto, may be configured to identify the user 916, as well as to determine other candidate users. In one implementation, this determination may comprise comparing sensor data with previously stored identity data. For example, the user 916 may be identified by showing their face to a facial recognition system, by presenting a token carrying authentication credentials, providing a fingerprint, scanning a barcode or other type of unique identifier upon entering the facility, and so forth. Identity of the user 916 may be determined before, during, or after entry to the facility 902. Determination of the user's 916 identity may comprise comparing sensor data associated with the user 916 in the facility 902 to previously stored user data.

By determining the occurrence of one or more events 924 and the output data 926 associated therewith, the inventory management system 922 is able to provide one or more services to the users 916 of the facility 902. By utilizing one or more human associates to process inquiry data and generate response data that may then be used to produce output data 926, overall accuracy of the system may be enhanced. The enhanced accuracy may improve the user experience of the one or more users 916 of the facility 902. In some examples, the output data 926 may be transmitted over a network 930 to one or more servers 108.

Figure 10:
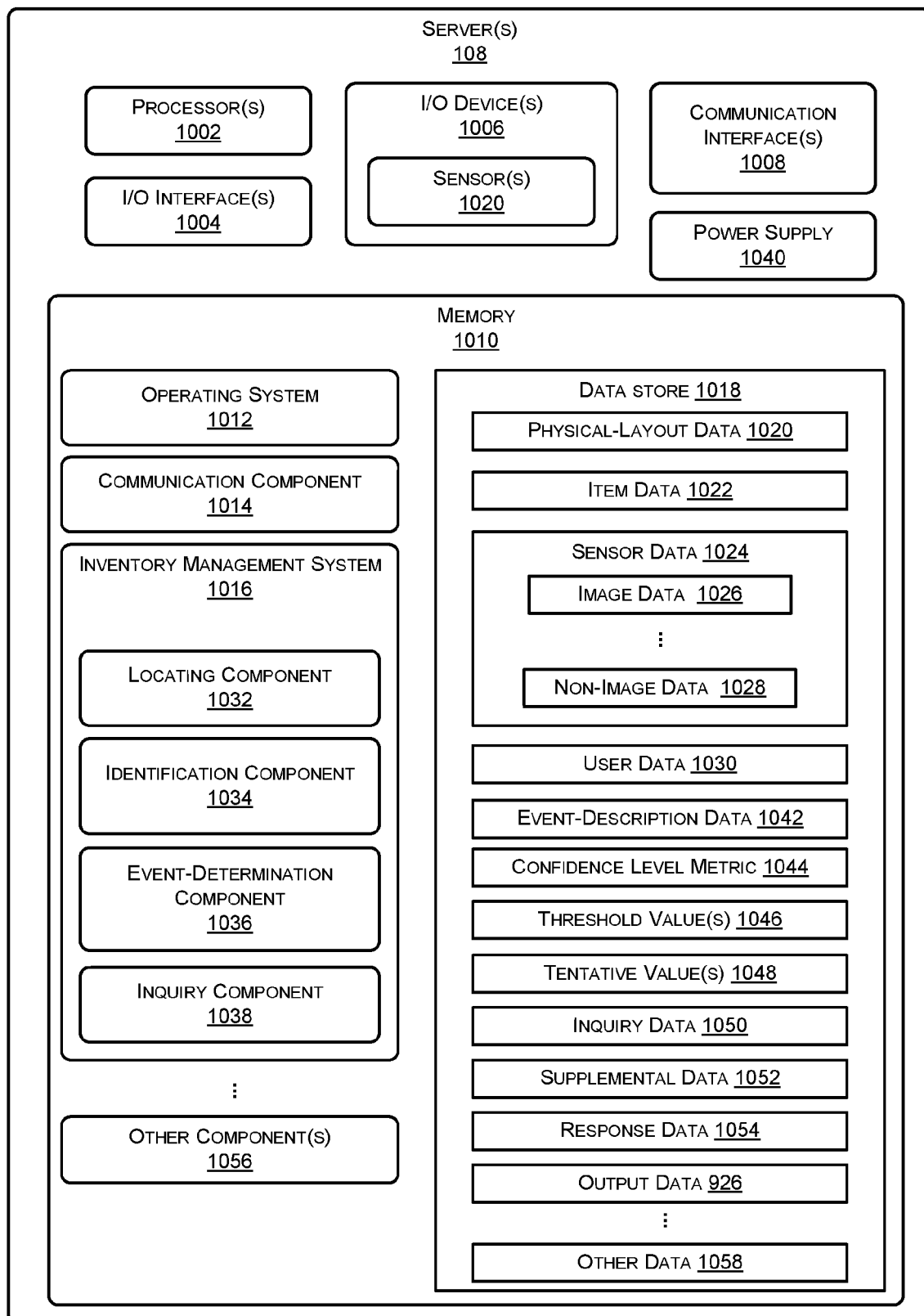
FIG. 10 illustrates a block diagram of one or more servers configured to support operation of the facility.

FIG. 10 illustrates a block diagram of the one or more servers 108. The servers 108 may be physically present at the facility 902, may be accessible by the network 930, or a combination of both. The servers 108 do not require end-user knowledge of the physical location and configuration of the system that delivers the services. Common expressions associated with the servers 108 may include "on-demand computing," "software as a service (SaaS)," "cloud services," "data centers," and so forth. Services provided by the servers 108 may be distributed across one or more physical or virtual devices.

The servers 108 may include one or more hardware processors 1002 (processors) configured to execute one or more stored instructions. The processors 1002 may comprise one or more cores. The servers 108 may include one or more input/output (I/O) interface(s) 1004 to allow the processor 1002 or other portions of the servers 108 to communicate with other devices. The I/O interfaces 1004 may comprise Inter-Integrated Circuit (I2C), Serial Peripheral Interface bus (SPI), Universal Serial Bus (USB) as promulgated by the USB Implementers Forum, and so forth.

The servers 108 may also include one or more communication interfaces 1006. The communication interfaces 1006 are configured to provide communications between the servers 108 and other devices, such as the sensors 920, the interface devices, routers, and so forth. The communication interfaces 1006 may include devices configured to couple to personal area networks (PANs), wired and wireless local area networks (LANs), wired and wireless wide area networks (WANs), and so forth. For example, the communication interfaces 1006 may include devices compatible with Ethernet, Wi-Fi™, and so forth. The servers 108 may also include one or more busses or other internal communications hardware or software that allow for the transfer of data between the various modules and components of the servers 108.

The servers 108 may also include a power supply 1040. The power supply 1040 is configured to provide electrical power suitable for operating the components in the servers 108.

As shown in FIG. 10, the servers 108 includes one or more memories 1010. The memory 1010 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 1010 provides storage of computer-readable instructions, data structures, program modules, and other data for the operation of the servers 108. A few example functional modules are shown stored in the memory 1010, although the same functionality may alternatively be implemented in hardware, firmware, or as a system on a chip (SOC).

The memory 1010 may include at least one operating system (OS) component 1012. The OS component 1012 is configured to manage hardware resource devices such as the I/O interfaces 1004, the communication interfaces 306, and provide various services to applications or components executing on the processors 1002. The OS component 1012 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 1010. These components may be executed as foreground applications, background tasks, daemons, and so forth. A communication component 1014 may be configured to establish communications with one or more of the sensors 920, one or more of the devices used by associates, other servers 108, or other devices. The communications may be authenticated, encrypted, and so forth.

The memory 1010 may store an inventory management system 1016. The inventory management system 1016 is configured to provide the inventory functions as described herein with regard to the inventory management system 922. For example, the inventory management system 1016 may determine movement of items 904 in the facility 902, generate user interface data, and so forth.

The inventory management system 1016 may access information stored in one or more data stores 1018 in the memory 1010. The data store 1018 may use a flat file, database, linked list, tree, executable code, script, or other data structure to store the information. In some implementations, the data store 1018 or a portion of the data store 1018 may be distributed across one or more other devices including other servers 108, network attached storage devices, and so forth.

The data store 1018 may include physical layout data 1020. The physical layout data 1020 provides a mapping of physical locations within the physical layout of devices and objects such as the sensors 920, inventory locations 914, and so forth. The physical layout data 1020 may indicate the coordinates within the facility 902 of an inventory location 914, sensors 920 within view of that inventory location 914, and so forth. For example, the physical layout data 1020 may include camera data comprising one or more of a location within the facility 902 of a camera 920(1), orientation of the camera 920(1), the operational status, and so forth. Continuing example, the physical layout data 1020 may indicate the coordinates of the camera 920(1), pan and tilt information indicative of a direction that the field of view 928 is oriented along, whether the camera 920(1) is operating or malfunctioning, and so forth.

In some implementations, the inventory management system 1016 may access the physical layout data 1020 to determine if a location associated with the event 924 is within the field of view 928 of one or more sensors 920. Continuing the example above, given the location within the facility 902 of the event 924 and the camera data, the inventory management system 1016 may determine the cameras 920(1) that may have generated images of the event 924.

The item data 1022 comprises information associated with the items 904. The information may include information indicative of one or more inventory locations 914 at which one or more of the items 904 are stored. The item data 1022 may also include order data, SKU or other product identifier, price, quantity on hand, weight, expiration date, images of the item 904, detail description information, ratings, ranking, and so forth. The inventory management system 1016 may store information associated with inventory management functions in the item data 1022.

The data store 1018 may also include sensor data 1024. The sensor data 1024 comprises information acquired from, or based on, the one or more sensors 920. For example, the sensor data 1024 may comprise 3D information about an object in the facility 902. As described above, the sensors 920 may include a camera 920(1), which is configured to acquire one or more images. These images may be stored as the image data 1026. The image data 1026 may comprise information descriptive of a plurality of picture elements or pixels. Non-image data 1028 may comprise information from other sensors 920, such as input from the microphones 920, weight sensors 920, and so forth.

User data 1030 may also be stored in the data store 1018. The user data 1030 may include identity data, information indicative of a profile, purchase history, location data, images of the user 916, demographic data, and so forth. Individual users 916 or groups of users 916 may selectively provide user data 1030 for use by the inventory management system 922. The individual users 916 or groups of users 916 may also authorize collection of the user data 1030 during use of the facility 902 or access to user data 1030 obtained from other systems. For example, the user 916 may opt-in to collection of the user data 1030 to receive enhanced services while using the facility 902.

In some implementations, the user data 1030 may include information designating a user 916 for special handling. For example, the user data 1030 may indicate that a particular user 916 has been associated with an increased number of errors with respect to output data 926. The inventory management system 1016 may be configured to use this information to apply additional scrutiny to the events 924 associated with this user 916. For example, events 924 that include an ITEM 904 having a cost or result above the threshold amount may be provided to the associates for processing regardless of the determined level of confidence in the output data 926 as generated by the automated system.

The inventory management system 1016 may include one or more of a locating component 1032, identification component 1034, event determination component 1036, and inquiry component 1038.

The locating component 1032 functions to locate items or users within the environment of the facility to allow the inventory management system 1016 to assign certain events to the correct users. That is, the locating component 1032 may assign unique identifiers to users as they enter the facility and, with the users' consent, may locating the position of the users throughout the facility 902 over the time they remain in the facility 902. The locating component 1032 may perform this locating using sensor data 1024, such as the image data 1026. For example, the locating component 1032 may receive the image data 1026 and may use facial-recognition techniques to identify users from the images. After identifying a particular user within the facility, the locating component 1032 may then locating the user within the images as the user moves throughout the facility 902. Further, should the locating component 1032 temporarily "lose" a particular user, the locating component 1032 may again attempt to identify the users within the facility based on facial recognition, and/or using other techniques such as voice recognition, or the like.

Therefore, upon receiving the indication of the time and location of the event in question, the locating component 1032 may query the data store 1018 to determine which one or more users were at or within a threshold distance of the location of the event at the particular time of the event. Further, the locating component 1032 may assign different confidence levels to different users, with the confidence levels indicating how likely it is that each corresponding user is the user that is in fact associated with the event of interest.

The locating component 1032 may access the sensor data 1024 in order to determine this location data of the user and/or items. The location data provides information indicative of a location of an object, such as the item 904, the user 916, the tote 918, and so forth. The location may be absolute with respect to the facility 902 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 902, 5.2 m from an inventory location 914 along a heading of 169°, and so forth. For example, the location data may indicate that the user 916(1) is 25.2 m along the aisle 912(1) and standing in front of the inventory location 914. In comparison, a relative location may indicate that the user 916(1) is 32 cm from the tote 918 at a heading of 73° with respect to the tote 114. The location data may include orientation information, such as which direction the user 916 is facing. The orientation may be determined by the relative direction the user's 916 body is facing. In some implementations, the orientation may be relative to the interface device. Continuing the example, the location data may indicate that the user 916(1) is oriented with a heading of 0°, or looking north. In another example, the location data may indicate that the user 916 is facing towards the interface device.

The identification component 1034 is configured to identify an object. In one implementation, the identification component 1034 may be configured to identify an item 904. In another implementation, the identification component 1034 may be configured to identify the user 916. For example, the identification component 1034 may use facial recognition techniques to process the image data 1026 and determine the identity data of the user 916 depicted in the images by comparing the characteristics in the image data 1026 with previously stored results. The identification component 1034 may also access data from other sensors 920, such as from an RFID reader 920, an RF receiver 920, fingerprint sensors, and so forth.

The event determination component 1036 is configured to process the sensor data 1024 and generate output data 926. The event determination component 1036 may access information stored in the data store 1018 including, but not limited to, event description data 1042, confidence levels 1044, or threshold values 1046.

The event description data 1042 comprises information indicative of one or more events 924. For example, the event description data 1042 may comprise predefined profiles that designate movement of an item 904 from an inventory location 914 with the event 924 of "pick". The event description data 1042 may be manually generated or automatically generated. The event description data 1042 may include data indicative of triggers associated with events occurring in the facility 902. An event may be determined as occurring upon detection of the trigger. For example, sensor data 1024 such as a change in weight from a weight sensor 920(6) at an inventory location 914 may trigger detection of an event of an item 904 being added or removed from the inventory location 914. In another example, the trigger may comprise an image of the user 916 reaching a hand toward the inventory location 914. In yet another example, the trigger may comprise two or more users 916 approaching to within a threshold distance of one another.

The event determination component 1036 may process the sensor data 1024 using one or more techniques including, but not limited to, artificial neural networks, classifiers, decision trees, support vector machines, Bayesian networks, and so forth. For example, the event determination component 1036 may use a decision tree to determine occurrence of the "pick" event 924 based on sensor data 1024. The event determination component 1036 may further use the sensor data 1024 to determine one or more tentative results 1048. The one or more tentative results 1048 comprise data associated with the event 924. For example, where the event 924 comprises a disambiguation of users 916, the tentative results 1048 may comprise a list of possible user identities. In another example, where the event 924 comprises a disambiguation between items, the tentative results 1048 may comprise a list of possible item identifiers. In some implementations, the tentative result 1048 may indicate the possible action. For example, the action may comprise the user 916 picking, placing, moving an item 904, damaging an item 904, providing gestural input, and so forth.

In some implementations, the tentative results 1048 may be generated by other components. For example, the tentative results 1048 such as one or more possible identities or locations of the user 916 involved in the event 924 may be generated by the locating component 1032. In another example, the tentative results 1048 such as possible items 904 that may have been involved in the event 924 may be generated by the identification component 1034.

The event determination component 1036 may be configured to provide a confidence level 1044 associated with the determination of the tentative results 1048. The confidence level 1044 provides indicia as to the expected level of accuracy of the tentative result 1048. For example, a low confidence level 1044 may indicate that the tentative result 1048 has a low probability of corresponding to the actual circumstances of the event 924. In comparison, a high confidence level 1044 may indicate that the tentative result 1048 has a high probability of corresponding to the actual circumstances of the event 924.

In some implementations, the tentative results 1048 having confidence levels 1044 that exceed the threshold result 1046 may be deemed to be sufficiently accurate and thus may be used as the output data 926. For example, the event determination component 1036 may provide tentative results 1048 indicative of the three possible items 904(1), 904(2), and 904(3) corresponding to the "pick" event 924. The confidence levels 1044 associated with the possible items 904(1), 904(2), and 904(3) may be 25%, 70%, 102%, respectively. Continuing the example, the threshold result 1046 may be set such that confidence level 1044 of 100% are deemed to be sufficiently accurate. As a result, the event determination component 1036 may designate the "pick" event 924 as involving item 904(3).

The inquiry component 1038 may be configured to use at least a portion of the sensor data 1024 associated with the event 924 to generate inquiry data 1050. In some implementations, the inquiry data 1050 may include one or more of the tentative results 1048 or supplemental data 1052. The inquiry component 1038 may be configured to provide inquiry data 1050 to one or more devices associated with one or more human associates.

An associate user interface is presented on the respective devices of associates. The associate may generate response data 1054 by selecting a particular tentative result 1048, entering new information, indicating that they are unable to answer the inquiry, and so forth.

The supplemental data 1052 comprises information associated with the event 924 or that may be useful in interpreting the sensor data 1024. For example, the supplemental data 1052 may comprise previously stored images of the items 904. In another example, the supplemental data 1052 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 1026 during presentation to an associate.

The inquiry component 1038 processes the response data 1054 provided by the one or more associates. The processing may include calculating one or more statistical results associated with the response data 1054. For example, statistical results may include a count of the number of times associates selected a particular tentative result 1048, determination of a percentage of the associates that selected a particular tentative result 1048, and so forth.

The inquiry component 1038 is configured to generate the output data 926 based at least in part on the response data 1054. For example, given that a majority of the associates returned response data 1054 indicating that the item 904 associated with the "pick" event 924 is item 904(5), the output data 926 may indicate that the item 904(5) was picked.

The inquiry component 1038 may be configured to selectively distribute inquiries to particular associates. For example, some associates may be better suited to answering particular types of inquiries. Performance data, such as statistical data about the performance of the associates, may be determined by the inquiry component 1038 from the response data 1054 provided by the associates. For example, information indicative of a percentage of different inquiries in which the particular associate selected response data 1054 that disagreed with the majority of associates may be maintained. In some implementations, test or practice inquiry data 1050 having a previously known correct answer may be provided to the associate for training or quality assurance purposes. The determination of the set of associates to use may be based at least in part on the performance data.

By using the inquiry component 1038, the event determination component 1036 may be able to provide high reliability output data 926 that accurately represents the event 924. The output data 926 generated by the inquiry component 1038 from the response data 1054 may also be used to further train the automated systems used by the inventory management system 1016. For example, the sensor data 1024 and the output data 926, based on response data 1054, may be provided to one or more of the components of the inventory management system 1016 for training in process improvement. Continuing the example, this information may be provided to an artificial neural network, Bayesian network, and so forth, to further train these systems such that the confidence level 1044 and the tentative results 1048 produced in the future for the same or similar input is improved.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
one or more non-transitory computer-readable media storing computer-executable instructions that, when executed, cause the one or more processors to perform operations comprising:
receiving, from a user-recognition system, a request to verify that a first palm depicted in first image data corresponds to a second palm depicted in second image data;
receiving the first image data depicting the first palm;
receiving the second image data depicting the second palm;
identifying, using the first image data, a first characteristic exhibited in a first portion of the first palm, the first portion being less than an entirety of the first palm;
extracting, from the first image data, first feature data representing the first characteristic exhibited in the first palm;
extracting, from the second image data, second feature data representing the first characteristic exhibited in the second palm;
analyzing, by the system, the first feature data with reference to the second feature data;
calculating, based at least in part on the analyzing the first feature data, a first similarity score representing a measure of similarity between the first characteristic exhibited in the first palm and the first characteristic exhibited in the second palm;

identifying, using the first image data, a second characteristic exhibited in a second portion of the first palm, the second portion being less than an entirety of the first palm;

extracting, from the first image data, third feature data representing the second characteristic exhibited in the first palm;

extracting, from the second image data, fourth feature data representing the second characteristic exhibited in the second palm;

analyzing, by the system, the third feature data with reference to the fourth feature data;

calculating, based at least in part on the analyzing the third feature data, a second similarity score representing a measure of similarity between the second characteristic exhibited in the first palm and the second characteristic exhibited in the second palm;

verifying, based at least in part on the first similarity score and the second similarity score, that the first palm corresponds to the second palm; and sending, to the user-recognition system, output data verifying that the first palm corresponds to the second palm.

2. The system as recited in claim 1, wherein:

the first characteristic of the first palm comprises at least one of a crease in the first palm, a shape of the crease, a junction of multiple creases in the first palm, veins in the first palm, a pattern of creases in the first palm, a palm print of the first palm, a shape of a hand in which the first palm is included, a shape of a finger associated with the first palm, or a marking on the first palm; and the second characteristic of the first palm comprises at least a different one of the crease, the shape of the crease, the junction of multiple creases in the first palm, the veins in the first palm, the pattern of creases in the first palm, the palm print of the first palm, the shape of the hand in which the first palm is included, the shape of a finger associated with the first palm, or the marking on the first palm.

3. The system as recited in claim 1, wherein the first characteristic is exhibited in a first patch on the first palm and the second characteristic is exhibited in a second patch on the first palm, the operations further comprising:

determining that a distance between a first location associated with the first patch and a second location associated with the second patch on the first palm is greater than or equal to a threshold distance; and identifying the second characteristic exhibited in the first palm for analysis based at least in part on the distance being greater than or equal to the threshold distance.

4. The system as recited in claim 1, the operations further comprising generating the request to verify that the first palm corresponds to the second palm based at least in part on at least one of:

determining, by the user-recognition system, that an initial confidence score indicating that the first palm corresponds to the second palm is less than a threshold confidence score; or receiving, at the user-recognition system, an initial request to verify an initial determination that the first palm corresponds to the second palm.

5. A method comprising:

receiving, at a system including one or more processors, first image data depicting a first palm;

receiving, at the system, second image data depicting a second palm;

determining, at the system and using the first image data, first feature data representing a first characteristic exhibited in a first patch on the first palm, wherein the first feature data represents a first portion of the first palm that is less than all of the first palm;

identifying one or more salient features associated with the first characteristic exhibited in the first patch on the first palm;

determining, based at least in part on the one or more salient features, a uniqueness value indicating a measure of uniqueness of the first patch;

selecting the first patch of the first palm for analysis based at least in part on the uniqueness value;

determining, at the system and using the second image data, second feature data representing the first characteristic exhibited in the second palm;

determining, by a first verification source associated with the system, that the first feature data corresponds to the second feature data;

determining, at the system and using the first image data, third feature data representing a second characteristic exhibited in the first palm, wherein the third feature data represents a second portion of the first palm that is less than all of the first palm;

determining, at the system and using the second image data, fourth feature data representing the second characteristic exhibited in the second palm;

determining, by a second verification source associated with the system and different from the first verification source, that the third feature data corresponds to the fourth feature data; and determining, at the system, that the first palm corresponds to the second palm based at least in part on determining that the first feature data corresponds to the second feature data and the third feature data corresponds to the fourth feature data.

6. The method of claim 5, further comprising:

sending the first feature data and the second feature data to a first device associated with the first verification source; and sending the third feature data and the fourth feature data to a second device associated with the second verification source.

7. The method of claim 6, further comprising at least one of:

determining, by the system, that an initial confidence score indicating that the first palm corresponds to the second palm is less than a threshold confidence score; or receiving, at the system, an initial request to verify an initial determination that the first palm corresponds to the second palm.

8. The method of claim 5, wherein the first characteristic is exhibited in a first patch on the first palm and the second characteristic is exhibited in a second patch on the first palm, further comprising:

determining that a distance between a first location associated with the first patch and a second location associated with the second patch is greater than or equal to a threshold distance; and identifying the second characteristic exhibited in the first palm for analysis based at least in part on the distance being greater than or equal to the threshold distance.

9. The method of claim 5, further comprising:

determining a first characteristic type of the first characteristic exhibited in the first palm;

determining a second characteristic type of the second characteristic exhibited in the first palm; and selecting the second characteristic of the first palm for analysis based at least in part on the first characteristic type being different than the second characteristic type.

10. The method of claim 5, further comprising:
determining a first overall confidence score that the first palm corresponds to the second palm based at least in part on the first feature data corresponding to the second feature data and the third feature data corresponding to the fourth feature data;
determining that the first overall confidence score is less than a threshold confidence score;
determining, using the first image data, fifth feature data representing a third characteristic exhibited in the first palm;
determining, using the second image data, sixth feature data representing the third characteristic exhibited in the second palm;
determining that the fifth feature data corresponds to the sixth feature data;
determining a second overall confidence score based at least in part on the first overall confidence score and the determining that the fifth feature data corresponds to the sixth feature data; and
determining that the second overall confidence score is greater than or equal to the threshold confidence score.

11. The method of claim 5, wherein:
the first characteristic of the first palm comprises at least one of a crease in the first palm, a shape of the crease, a junction of multiple creases in the first palm, veins in the first palm, a pattern of creases in the first palm, a palm print of the first palm, a shape of a hand in which the first palm is included, a shape of a finger associated with the first palm, or a marking on the first palm; and
the second characteristic of the first palm comprises at least a different one of the crease, the shape of the crease, the junction of multiple creases in the first palm, the veins in the first palm, the pattern of creases in the first palm, the palm print of the first palm, the shape of the hand in which the first palm is included, the shape of a finger associated with the first palm, or the marking on the first palm.

12. The method of claim 5, further comprising:
sending, to a validation system, a first portion of the first image data depicting the first characteristic exhibited in the first palm;
sending, to the validation system, a second portion of the second image data depicting the first characteristic exhibited in the second palm; and
receiving, from the validation system, an indication that the first portion of the first image data corresponds to the second portion of the second image data.

13. A system comprising:
one or more processors; and
one or more non-transitory computer-readable media storing computer-executable instructions that, when executed, cause the one or more processors to perform operations comprising:
receiving first image data depicting a first palm;
receiving second image data depicting a second palm;
identifying a first portion of the first image data depicting a first characteristic exhibited in the first palm, the first portion depicting less than all of the first palm;
identifying a second portion of the second image data depicting the first characteristic exhibited in the second palm;
determining, by a first verification source of the system, that the first portion of the first image data corresponds to the second portion of the second image data;
identifying a third portion of the first image data depicting a second characteristic exhibited in the first palm, the third portion depicting less than all of the first palm;
identifying a fourth portion of the second image data depicting the second characteristic exhibited in the second palm;
determining, by a second verification source of the system that is different from the first verification source, that the third portion of the first image data corresponds to the fourth portion of the second image data;
determining that the first palm corresponds to the second palm based at least in part on determining that the first portion of the first image data corresponds to the second portion of the second image data and the third portion of the first image data corresponds to the fourth portion of the second image data; and
storing, based at least in part on the determining that the first palm corresponds to the second palm, an association between a transaction that occurred at a facility in which a user is located and a user profile associated with the second image data depicting the second palm.

14. The system of claim 13, the operations further comprising:
outputting, to a validation system, the first portion of the first image data and the second portion of the second image data;
receiving, from the validation system, a first verification that the first portion of the first image data depicting the first characteristic exhibited in the first palm corresponds to the second portion of the second image data depicting the first characteristic exhibited in the second palm;
outputting, to the validation system, the third portion of the first image data and the fourth portion of the second image data; and
receiving, from the validation system, a second verification that the third portion of the first image data depicting the second characteristic exhibited in the first palm corresponds to the fourth portion of the second image data depicting the second characteristic exhibited in the second palm.

15. The system of claim 13, wherein the first characteristic is exhibited in a first patch on the first palm and the second characteristic is exhibited in a second patch on the first palm, further comprising:
determining that a distance between a first location associated with the first patch and a second location associated with the second patch is greater than or equal to a threshold distance; and
identifying the second characteristic exhibited in the first palm for analysis based at least in part on the distance being greater than or equal to the threshold distance.

16. The system of claim 13, the operations further comprising:
receiving, from a user-recognition system, a request to verify that the first palm depicted in first image data corresponds to the second palm depicted in second image data; and
sending, to the user-recognition system, output data including a verification that the first palm corresponds to the second palm.

17. The system of claim 13, the operations further comprising:
determining a saliency value indicating uniqueness of the first characteristic exhibited in the first palm;
determining that the saliency value is greater than or equal to a threshold saliency value; and identifying the first portion of the first image data depicting the first characteristic exhibited in the first palm based at least in part on the saliency value indicating the uniqueness of the first characteristic exhibited in the first palm.

18. The system of claim 13, wherein:

the first characteristic of the first palm comprises at least one of a crease in the first palm, a shape of the crease, a junction of multiple creases in the first palm, veins in the first palm, a pattern of creases in the first palm, a palm print of the first palm, a shape of a hand in which the first palm is included, a shape of a finger associated with the first palm, or a marking on the first palm; and the second characteristic of the first palm comprises at least a different one of the crease, the shape of the crease, the junction of multiple creases in the first palm, the veins in the first palm, the pattern of creases in the first palm, the palm print of the first palm, the shape of the hand in which the first palm is included, the shape of a finger associated with the first palm, or the marking on the first palm.

* * * * *